(12) United States Patent
Scherer

(10) Patent No.: US 7,208,112 B2
(45) Date of Patent: Apr. 24, 2007

(54) CONCRETE BLOCK AND METHOD OF MAKING SAME

(75) Inventor: Ronald J. Scherer, Shakopee, MN (US)

(73) Assignee: Anchor Wall Systems, Inc., Minnetonka, MN (US)

(*) Notice: Subject to any disclaimer, the term of this patent is extended or adjusted under 35 U.S.C. 154(b) by 325 days.

(21) Appl. No.: 10/359,525

(22) Filed: Feb. 5, 2003

(65) Prior Publication Data

US 2003/0182011 A1 Sep. 25, 2003

Related U.S. Application Data

(63) Continuation-in-part of application No. 10/038,639, filed on Jan. 4, 2002.

(51) Int. Cl.
*B28B 3/00* (2006.01)
*B29C 33/38* (2006.01)
*G06F 19/00* (2006.01)

(52) U.S. Cl. ............... 264/219; 264/236; 264/293; 264/333; 264/334; 700/117; 700/164; 700/197

(58) Field of Classification Search ............ 264/69, 264/219, 236, 293, 333, 334; 700/117, 164, 700/197
See application file for complete search history.

(56) References Cited

U.S. PATENT DOCUMENTS

| | | | |
|---|---|---|---|
| 415,773 A | 11/1889 | Fiske | |
| 799,754 A | 9/1905 | Petrie | |
| 803,014 A | 10/1905 | McIlravy | |
| 813,901 A | 2/1906 | Leming et al. | |
| 819,055 A | 5/1906 | Fisher | |
| 824,235 A | 6/1906 | Damon | |
| 838,278 A | 12/1906 | Schwartz | |
| 1,086,975 A | 2/1914 | Aaronson | |
| 1,166,312 A | 12/1915 | Barten | |

(Continued)

FOREIGN PATENT DOCUMENTS

DE 196 34 499 A1 3/1998

(Continued)

OTHER PUBLICATIONS

"Slab Molds, Dream Molds," *KOBRA Formen GmbH*, 2 pages (Date Unknown).

(Continued)

*Primary Examiner*—Leo B. Tentoni
(74) *Attorney, Agent, or Firm*—Merchant & Gould P.C.

(57) ABSTRACT

Molds and processes that permit high-speed, mass production of retaining wall blocks having patterned or other processed front faces, as well as retaining wall blocks formed by such processes. The invention permits the front face of the block to be impressed with a pattern or otherwise directly processed, to allow the formation of pre-determined block front faces, while at the same time facilitating high-speed, high-volume production of blocks. A mirror image of the desired pattern can be created on a stripper shoe by selecting a desired three-dimensional surface from a naturally occurring or man made object and digitally scanning the selected three-dimensional pattern to create scanned data. The scanned data can then be used to machine a face of the stripper shoe that is the mirror image of the selected pattern.

20 Claims, 19 Drawing Sheets

U.S. PATENT DOCUMENTS

| | | |
|---|---|---|
| 1,564,490 A | 12/1925 | Parkhurst |
| 1,596,165 A | 8/1926 | Evans |
| 1,693,852 A | 12/1928 | McQuain |
| 1,776,999 A | 9/1930 | Jensen |
| 1,982,730 A | 12/1934 | Erkman |
| 2,038,205 A | 4/1936 | Case |
| 2,313,363 A | 3/1943 | Schmitt |
| 2,457,368 A | 12/1948 | Hanson |
| 2,517,432 A | 8/1950 | Hornberger |
| 2,682,093 A | 6/1954 | Clanton |
| 2,819,495 A | 1/1958 | Krausz |
| 2,882,689 A | 4/1959 | Huch et al. |
| 3,013,321 A | 12/1961 | McElroy |
| 3,204,316 A | 9/1965 | Jackson |
| 3,277,551 A | 10/1966 | Sekiguchi |
| 3,425,105 A | 2/1969 | Gulde |
| 3,530,553 A | 9/1970 | Engle et al. |
| 3,669,402 A | 6/1972 | Paulson |
| 3,694,128 A | 9/1972 | Foxen |
| 3,731,899 A | 5/1973 | Nuzzo |
| 3,809,049 A | 5/1974 | Fletcher et al. |
| 3,918,877 A | 11/1975 | Pickett |
| 3,940,229 A | 2/1976 | Hutton |
| 3,981,953 A | 9/1976 | Haines |
| 4,050,864 A | 9/1977 | Komaki |
| 4,063,866 A | 12/1977 | Lurbiecki |
| 4,178,340 A | 12/1979 | Hyytinen |
| 4,272,230 A | 6/1981 | Abate |
| 4,784,821 A | 11/1988 | Leopold |
| 4,802,836 A | 2/1989 | Whissell |
| 4,869,660 A | 9/1989 | Ruckstuhl |
| 4,902,211 A | 2/1990 | Svanholm |
| 4,909,717 A | 3/1990 | Pardo |
| D317,048 S | 5/1991 | Forsberg |
| D317,209 S | 5/1991 | Forsberg |
| D321,060 S | 10/1991 | Blomquist et al. |
| 5,056,998 A | 10/1991 | Goossens |
| 5,078,940 A | 1/1992 | Sayles |
| 5,183,616 A | 2/1993 | Hedrick |
| D341,215 S | 11/1993 | Blomquist et al. |
| 5,366,676 A | 11/1994 | Kobayashi |
| 5,435,949 A | 7/1995 | Hwang |
| 5,484,236 A | 1/1996 | Gravier |
| 5,534,214 A | 7/1996 | Sakamoto et al. |
| 5,598,679 A | 2/1997 | Orton et al. |
| 5,651,912 A | 7/1997 | Mitsumoto et al. |
| 5,744,081 A | 4/1998 | Tanigawa et al. |
| 5,756,131 A | 5/1998 | Suh |
| 5,816,749 A | 10/1998 | Bailey, II |
| 5,827,015 A | 10/1998 | Woolford et al. |
| D438,640 S | 3/2001 | Bolles et al. |
| 6,205,728 B1 * | 3/2001 | Sutelan ...................... 52/309.7 |
| 6,321,740 B1 | 11/2001 | Scherer et al. |
| 2003/0182011 A1 | 9/2003 | Scherer |

FOREIGN PATENT DOCUMENTS

| | | |
|---|---|---|
| DE | 100 02 390 A1 | 7/2001 |
| GB | 944066 A | 12/1963 |
| GB | 2 232 114 A | 12/1990 |
| WO | 03/060251 A1 | 7/2003 |

OTHER PUBLICATIONS

"Kobra Slab Molds: Optimum Slab Production on Big Board Machines, Design and benefits," *KOBRA*, 2 pages (Date Unknown).

* cited by examiner

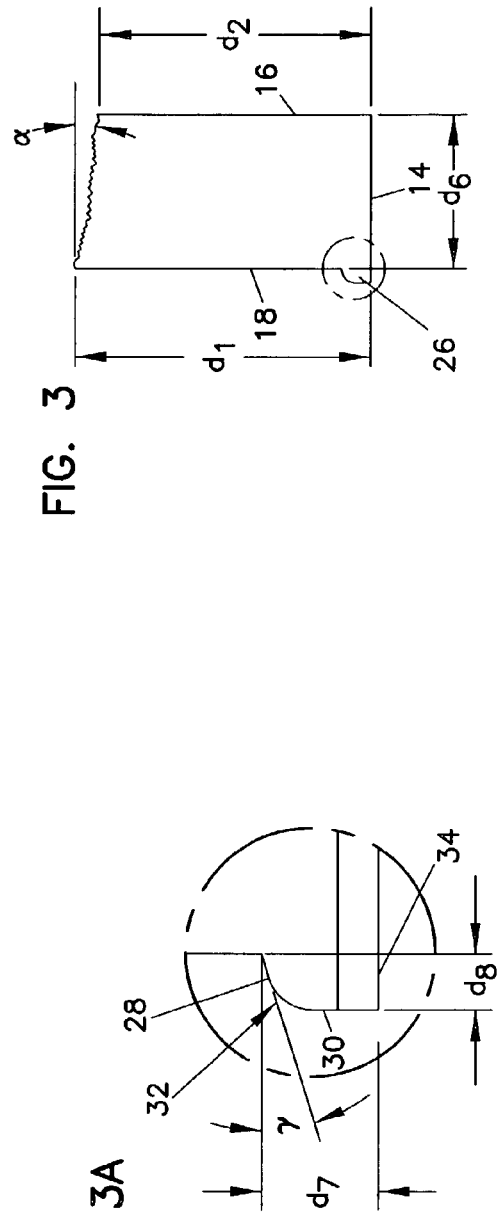
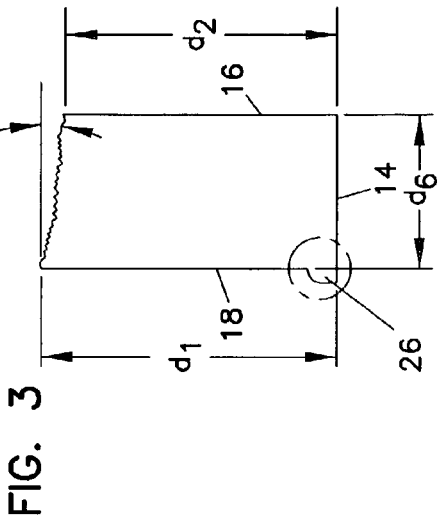
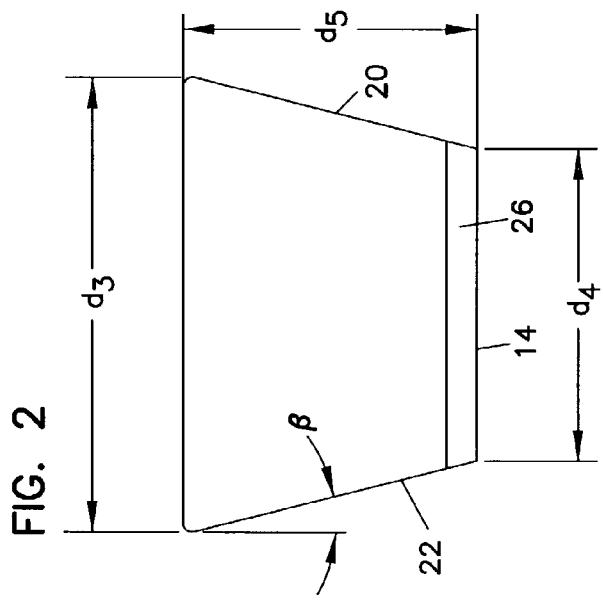
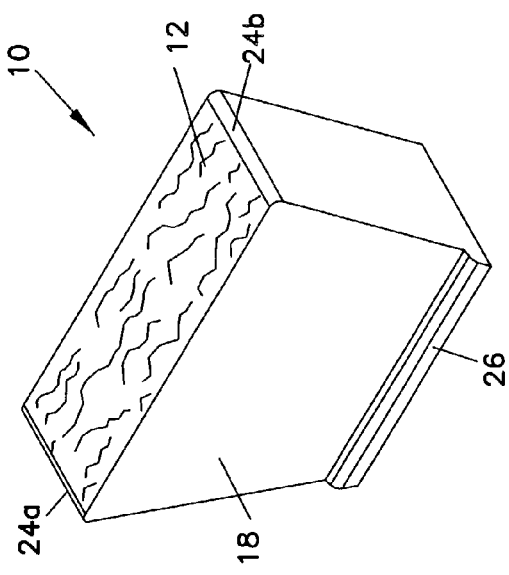

CONCRETE BLOCK AND METHOD OF MAKING SAME

RELATED APPLICATION

This is a continuation-in-part of U.S. patent application Ser. No. 10/038,639, filed on Jan. 4, 2002, which is herein incorporated by reference in its entirety.

FIELD OF THE INVENTION

The invention relates generally to concrete blocks and the manufacture thereof. More specifically, the invention relates to concrete blocks suitable for use in landscaping applications, such as retaining walls, and manufacturing processes useful in the production of such blocks.

BACKGROUND OF THE INVENTION

Modern, high speed, automated concrete block plants and concrete paver plants make use of molds that are open at the top and bottom. These molds are mounted in machines which cyclically station a pallet below the mold to close the bottom of the mold, deliver dry cast concrete into the mold through the open top of the mold, densify and compact the concrete by a combination of vibration and pressure, and strip the mold by a relative vertical movement of the mold and the pallet.

Due to the nature of such plants and the equipment used to perform this process, it is difficult to impart a natural appearance to the face of a concrete block, particularly if the block needs to include other features, such as converging side walls, and an integral locator and shear flange(s) formed on the top and/or bottom face of the block. U.S. Pat. No. 5,827,015, which is incorporated herein by reference, discloses such a concrete block suitable for use as a retaining wall block, and the common method for producing such a block in a high speed, automated concrete block plant.

There is demand for a pre-formed concrete unit, particularly a retaining wall block with converging side walls and/or an integral locator and shear flange formed on the top and/or bottom face, and having a more natural appearing face than is achievable by the splitting process described in U.S. Pat. No. 5,827,015, or by the splitting process described in U.S. Pat. No. 6,321,740, which is also incorporated herein by reference. In particular, there is a demand for processes and tooling that will create such blocks with such faces in high-speed, automated fashion on the type of equipment commonly available in a concrete block or concrete paver plant.

SUMMARY OF THE INVENTION

The invention relates to molds and processes that permit high speed, mass production of concrete units, and, in particular, retaining wall blocks. These molds and processes can be used to create relatively simple decorative front faces on such blocks, similar to the split faces described in U.S. Pat. No. 5,827,015. These molds and processes can also be used to create more complex front faces on such blocks, similar to the split and distressed faces produced by conventional tumbling or hammermill processing, or by the process described in U.S. Pat. No. 6,321,740. These molds and processes can also be used to create unique blocks that have heretofore not been available: retaining wall blocks with converging side walls and/or integral locator and shear flanges and with front faces with significantly more complex faces, including faces with significant detail and relief not heretofore available in dry cast concrete block technology.

In a preferred embodiment, the resulting blocks have patterned front faces that simulate natural stone, as well as upper and lower faces, a rear face, opposed converging side faces, and a flange extending below the lower face. Blocks having this construction, when stacked in multiple courses with other similarly constructed retaining wall blocks, permits construction of serpentine or curved retaining walls that appear to have been constructed with naturally-occurring, rather than man-made, materials.

One aspect of this invention is that a mold made in accordance with the invention is arranged so that the portion of the block that will be the front face when the block is laid is facing the open top of the mold cavity during the molding process. This orientation permits the front face of the block to be formed by the action of a patterned pressure plate ("stripper shoe") in a high-speed, concrete block or paver plant. The stripper shoe can be provided with a very simple pattern, a moderately complex pattern, or a highly detailed, three-dimensional pattern with significant relief, simulating naturally occurring stone. Molding the block in this orientation also makes the block face readily accessible for other processing to affect the appearance of the face, including the application of specially-selected aggregate and/or color pigments to the face.

Another aspect of this invention is that a side wall of the mold has an undercut portion adjacent the open bottom of the mold cavity. This undercut portion cooperates with the pallet that is positioned under the mold to form a subcavity of the mold. In a preferred embodiment, this subcavity forms the locator and shear flange on the surface of the block that will be the bottom of the block as laid.

Another aspect of this invention is that at least one of the side walls of the mold is angled from vertical, to form a side wall of the block as laid that includes a portion that converges toward the opposite side wall as it gets closer to the rear face of the block. This angled mold side wall is moveable, so that it moves into a first position to permit the mold to be filled with dry cast concrete and the concrete to be compacted and densified, and moves into a second position to permit the densified concrete to be stripped from the mold without interference from this mold side wall. In a preferred embodiment, the opposed mold side wall is similarly moveable, so that at least portions of the opposed side walls of the resulting block converge towards each other as they approach the rear of the block.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying description, in which there is described a preferred embodiment of the invention.

BRIEF DESCRIPTION OF THE DRAWINGS

FIG. 1 is a perspective view of a retaining wall block according to the present invention, with the block being oriented in the position in which it is formed in the mold.

FIG. 2 is a bottom plan view of the retaining wall block of FIG. 1.

FIG. 3 is a side elevation view of the retaining wall block of FIG. 1.

FIG. 3A is a detailed view of the portion of the retaining wall block contained within the dashed circle in FIG. 3.

DETAILED DESCRIPTION OF THE PREFERRED EMBODIMENT

Overview

Figure 4:
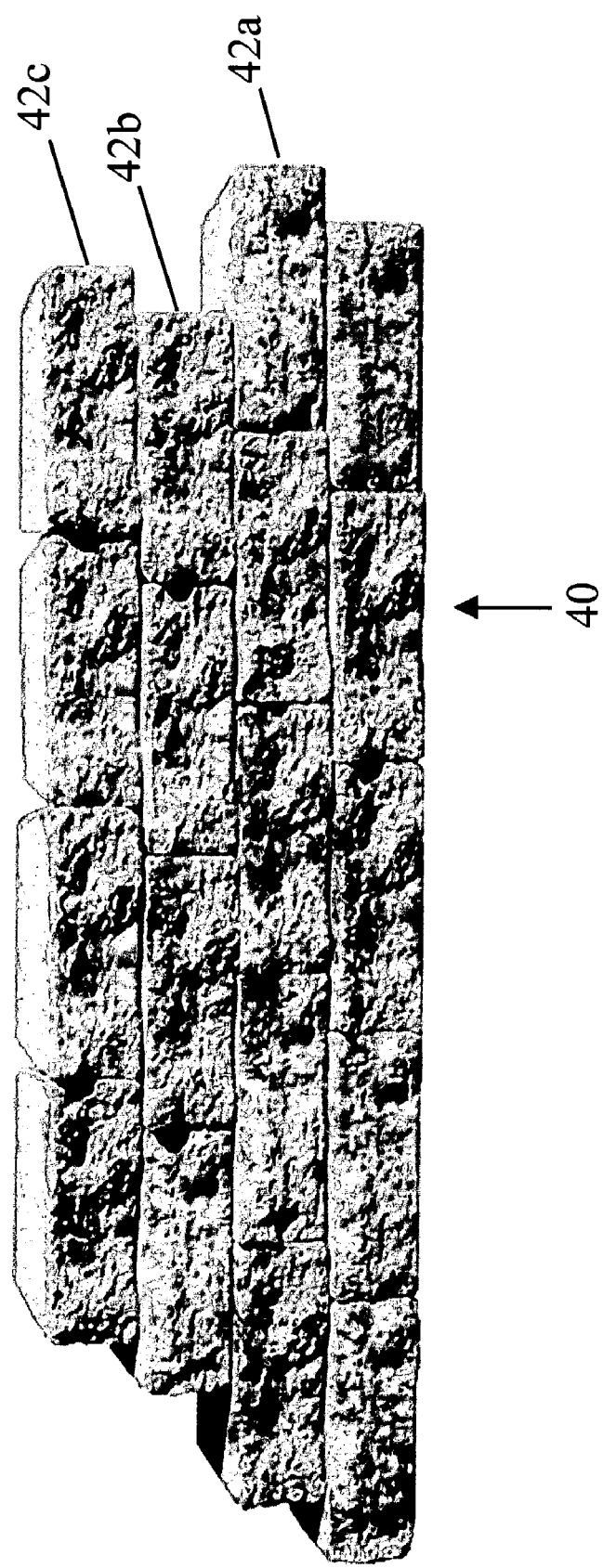
FIG. 4 is a front view of a portion of a retaining wall constructed from a plurality of blocks according to the present invention.

The present invention provides a process for producing a concrete block, as well as a block resulting from the process, and a mold and mold components used to implement the process, in which a pre-determined three-dimensional pattern is impressed into the face of the block, and the front face of the block can be otherwise directly processed or worked so that a pre-determined block front face can be produced in a standard dry cast concrete block or paver machine. Direct processing or working of the front face includes molding, shaping, patterning, impressing, material layering, combinations thereof, and other processes in which the texture, shape, color, appearance, or physical properties of the front face can be directly affected. Further, the process can be implemented using multiple-cavity molds to permit high-speed, high-volume production of the concrete blocks on standard dry cast concrete block or paver equipment. Moreover, use of the inventive process and equipment eliminates the need for a splitting station, and/or a hammermill station, and/or a tumbling station, and the additional equipment and processing costs associated with such additional processing stations.

The blocks produced by the process of the present invention can have a configuration that allows construction of walls, including serpentine or curved retaining walls, by stacking a plurality of blocks, having the same or different pre-determined front faces, in multiple courses, with an automatic set-back and shear resistance between courses.

The preferred embodiment will be described in relation to the impressing of a pre-determined, three-dimensional, rock-like pattern into the front face of a retaining wall block. As a result, the block, and a wall that is constructed from a plurality of the blocks when stacked into courses, appears to have been constructed with "natural" materials. The process described herein could also be used to construct concrete blocks that are used in the construction of building walls, as well as for concrete bricks, slabs and pavers.

Concrete Block

A concrete block 10 according to the present invention is illustrated in FIGS. 1–3. The block 10 comprises a block body having a front face 12, a rear face 14, an upper face 16, a lower face 18, and opposed side faces 20, 22. (Note that the terms front, rear, upper, and lower faces reference the orientation of the faces of the block as placed within a retaining wall and do not necessarily reflect the orientation of the block as it is produced.) The block 10 is formed from a cured, dry cast, no slump concrete. Dry cast, no slump concrete is well known in the art of retaining wall blocks.

Figure 14A:
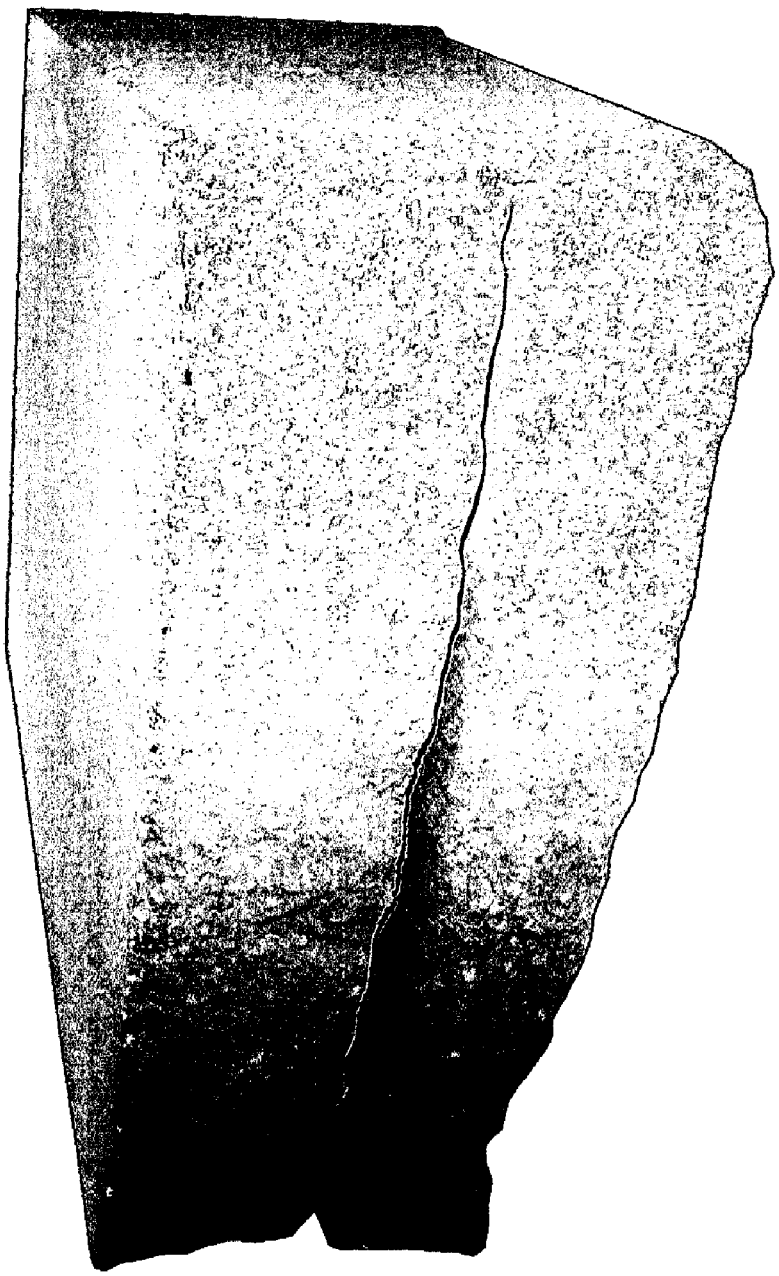
FIGS. 14A, 14B and 14C are photographs of retaining wall blocks according to the present invention.
Figure 14B:
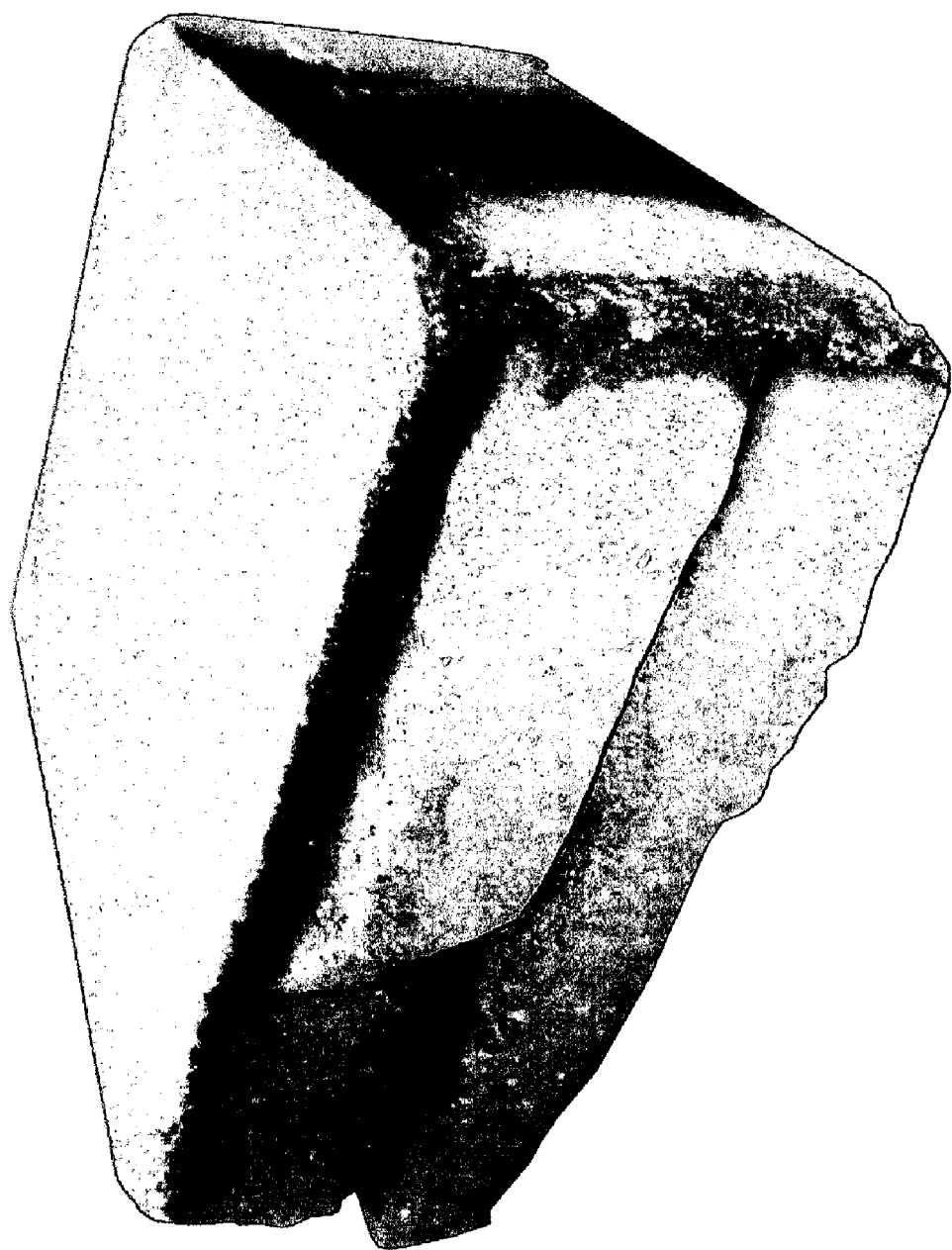
Figure 14C:
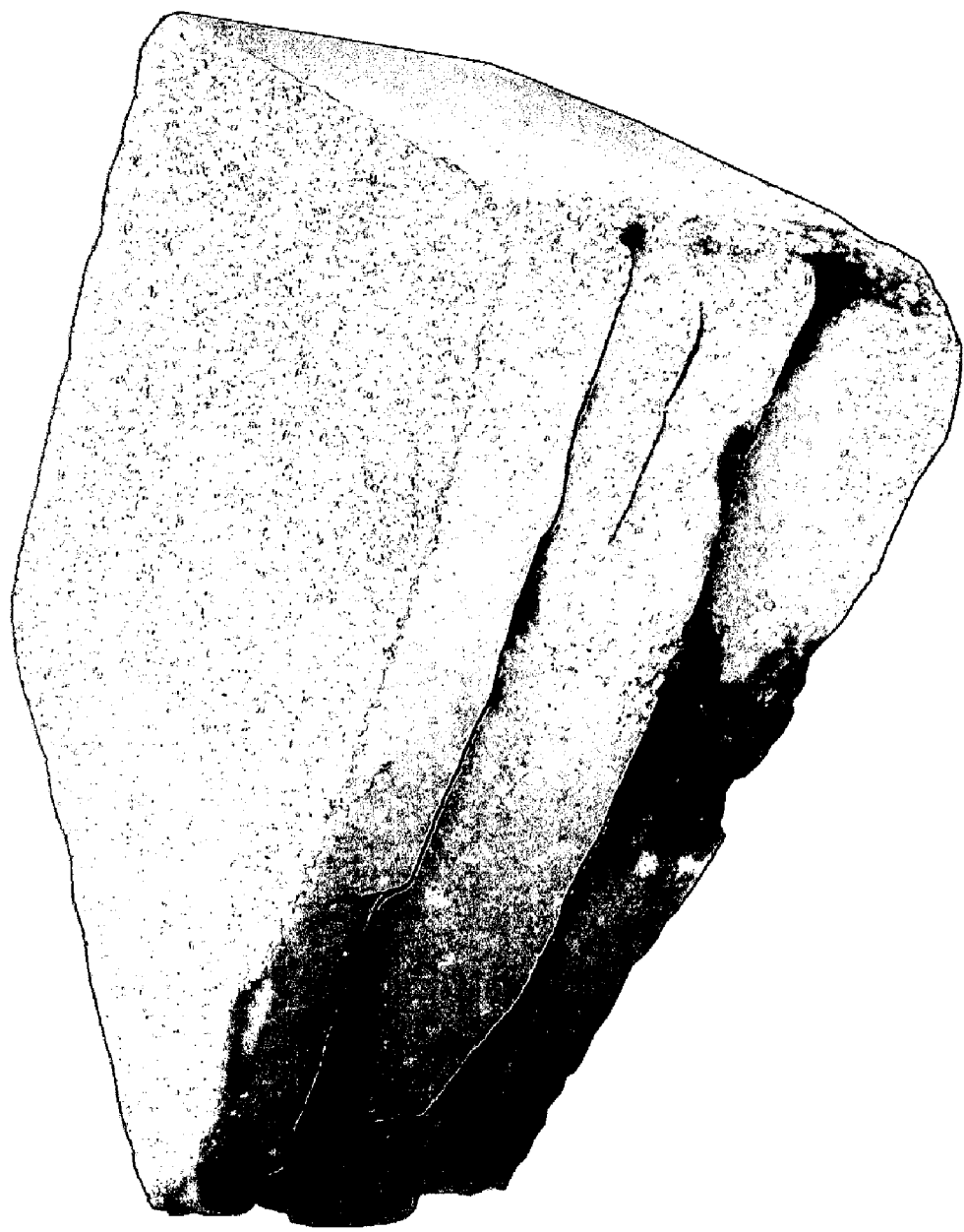

The front face 12, as shown in FIGS. 1–3, is provided with a pre-determined three-dimensional pattern. The pattern on the front face 12 is preferably imparted to the front face during molding of the block 10 by the action of a moveable stripper shoe (to be later described) having a pattern that is the mirror image of the front face of the block. FIGS. 14A–C are photos of blocks according to the present invention having patterned front faces.

The pattern that is imparted to the front face 12 can vary depending upon the desired appearance of the front face. Preferably, the pattern simulates natural stone so that the front face 12 appears to be a natural material, rather than a man-made material. The particular stone pattern that is used will be selected based on what is thought to be visually pleasing to users of the blocks. By way of example, the face of the block can be impressed with a pattern that appears to be a single stone, such as river rock. Or the block can be impressed with a pattern that appears to be multiple river rocks in a mortared together pattern. Or the block can be impressed with a pattern that simulates a single piece of quarry rubble, or multiple pieces of field stone, stacked in layers. Endless possibilities are available. By providing stripper shoes with a variety of different patterns, the resulting patterns on the blocks can be varied by changing stripper shoes.

The resulting detail and relief that can be provided on the front face is greater than that which can be provided on a front face of a block that results from conventional splitting techniques, and the tumbling, hammermilling and other distressing techniques previously described. The relief on the patterned front face 12, measured from the lowest point to the highest point, is preferably at least 0.5 inches, and more preferably at least 1.0 inches.

In the preferred embodiment, the front face 12 lies generally in approximately a single plane between the side faces 20, 22, as opposed to the common, three-faceted and curved faces that are frequently seen in split-face retaining wall blocks, although such multi-faceted and curved faces can be easily produced with the present invention. As shown in FIG. 3, the front face 12 is provided with a slight rearward slant, i.e. inclined at an angle α from the bottom lower face 18 to the upper face 16. Preferably, α is about 10 degrees. As a result, front and rear faces 12, 14 are separated by a distance $d_1$ adjacent the lower face 18 and by a distance $d_2$ adjacent the upper face 16, with $d_1$ being larger than $d_2$. In the preferred embodiment, $d_1$ is about 7.625 inches and $d_2$ is about 6.875 inches. The width $d_3$ is preferably about 12.0 inches. It is also contemplated that the front face 12 between the side faces 20, 22 can be faceted, curved, or combinations thereof. In these embodiments, the front face would also have a slight rearward slant.

Typically, when retaining wall blocks are stacked into set-back courses to form a wall, a portion of the upper face of each block in the lower course is visible between the front face of each block in the lower course and the front face of each block in the adjacent upper course. The visible portions of the upper faces create the appearance of a ledge. And, in the case of dry cast concrete blocks, this ledge typically has an artificial appearance. By providing a rearward incline angle to the front face 12 of the block 10, the appearance of the ledge can be reduced or eliminated, thus enhancing the "natural" appearance of the resulting wall.

The front face 12 also includes radiused edges 24a, 24b at its junctures with the side faces. The radiused edges 24a, 24b are formed by arcuate flanges provided on the stripper shoe. The radius of the edges 24a, 24b is preferably about 0.25 inches. The radiused edges 24a, 24b shift the contact points between the sides of the block 10 with adjacent blocks in the same course, when a plurality of blocks are laid side-by-side, away from the front face 12, and result in better contact between the blocks to prevent soil "leakage" between adjacent blocks. If desired, the top and bottom edges at the junctures between the front face 12 and the upper and lower faces 16, 18 could also be radiused, similar to the radiused edges 24a, 24b, by the provision of arcuate flanges on the stripper shoe.

With reference to FIGS. 1–3, the rear face 14 of the block 10 is illustrated as being generally planar between the side faces 20, 22 and generally perpendicular to the upper and lower faces 16, 18. However, it is contemplated that the rear face 14 could deviate from planar, such as by being provided with one or more notches or provided with one or more concavities, while still being within the scope of the invention. The width $d_4$ of the rear face 14 is preferably about 8.202 inches.

Further, the upper face 16 is illustrated in FIGS. 1–3 as being generally planar, and free of cores intersecting the upper face 16. When a plurality of blocks 10 is stacked into courses to form a wall structure, the upper face 16 of each block is in a generally parallel relationship to the upper faces 16 of the other blocks.

The lower face 18 of the block 10 is formed so as to be suitable for engaging the upper face 16 of the block(s) in the course below to maintain the generally parallel relationship between the upper faces of the blocks 10 when the blocks are stacked into courses. In the preferred embodiment, as illustrated in FIGS. 1–3, the lower face 18 is generally planar and horizontal so that it is generally parallel to the upper face 16. However, other lower faces can be used, including a lower face that includes one or more concave portions or one or more channels over portions of the lower face 18. The distance $d_6$ between the upper face 16 and the lower face 18 is preferably about 4.0 inches.

In the preferred block 10, the side faces 20, 22 are generally vertical and join the upper and lower faces 16, 18 and join the front and rear faces 12, 14, as seen in FIGS. 1–3. At least a portion of each side face 20, 22 converges toward the opposite side face as the side faces extend toward the rear face 14. Preferably the entire length of each side face 20, 22 converges starting from adjacent the front face 18, with the side faces 20, 22 being generally planar between the front and rear faces 12, 14. However, it is possible that the side faces 20, 22 could start converging from a location spaced from the front face 12, in which case the side faces 20, 22 would comprise a combination of straight, non-converging sections extending from the front face and converging sections leading from the straight sections to the rear face 14. The converging portion of each side face 20,22 preferably converges at an angle β of about 14.5 degrees.

Alternatively, the block 10 can be provided with only one converging side face or side face portion, with the other side face being substantially perpendicular to the front and rear faces 12, 14. A block with at least one converging side face permits serpentine retaining walls to be constructed.

The block 10 also preferably includes a flange 26 that extends below the lower face 18 of the block, as seen in FIGS. 1–3. The flange 26 is designed to abut against the rear face of a block in the course below the block 10 to provide a pre-determined set-back from the course below and provide course-to-course shear strength.

With reference to FIG. 3A, it is seen that the flange 26 includes a front surface 28 that engages the rear face of the block(s) in the course below. The flange 26 also includes a bottom surface 30, a front, bottom edge 32 between the front surface 28 and the bottom surface 30 that is arcuate, and a rear surface 34 that is extension of, and forms a portion of, the rear face 14 of the block. The front surface 28 is preferably angled at an angle γ of about 18 degrees. The angled front surface 28 and the arcuate edge 32 result from corresponding shaped portions of the mold, which construction facilitates filling of the mold with dry cast concrete and release of the flange 26 from the mold.

As shown in FIGS. 1 and 2, the flange 26 extends the entire distance between the side faces 20, 22. However, the flange need not extend the entire distance. For example, the flange could extend only a portion of the distance between the side faces, and be spaced from the side faces. Alternatively, two or more flange portions separated from each other by a gap could be used.

With reference to FIG. 3A, the depth $d_7$ of the flange 26 is preferably about 0.750 inches. This depth defines the resulting set-back of the block relative to the course below. Other flange dimensions could be used, depending upon the amount of desired set-back. The rear surface 34 preferably has a height $d_8$ of about 0.375 inches.

The concepts described can also be applied to concrete blocks that are used in the construction of building walls, as well as to concrete bricks, slabs and pavers. In these cases, it is contemplated and within the scope of the invention that neither side face of the block or brick would converge, and that the flange would not be present. However, the patterned front face would provide the block or brick a decorative appearance.

Block Structures

The concrete block 10 of the present invention may be used to build any number of landscape structures. An example of a structure that may be constructed with blocks according to the invention is illustrated in FIG. 4. As illustrated, a retaining wall 40 composed of individual courses 42a–c of blocks can be constructed. The blocks used in constructing the wall 40 can comprise blocks having identically patterned front faces, or a mixture of blocks with different, but compatibly-patterned faces. The height of the wall 40 will depend upon the number of courses that are used. The construction of retaining walls is well known in the art. A description of a suitable process for constructing the wall 40 is disclosed in U.S. Pat. No. 5,827,015.

As discussed above, the flange 26 on the block 10 provides set-back of the block from the course below. As a result, the course 42b is set-back from the course 42a, and the course 42c is set-back from the course 42b. Further, as discussed above, the rearward incline of the front face 12 reduces the ledge that is formed between each adjacent course, by reducing the amount of the upper face portion of each block in the lower course that is visible between the front face of each block in the lower course and the front face of each block in the adjacent upper course.

The retaining wall 40 illustrated in FIG. 4 is straight. However, the preferred block 10 construction with the angled side faces 20, 22 permits the construction of serpentine or curved retaining walls, such as is disclosed in U.S. Pat. No. 5,827,015.

Block Forming Process

Figure 5:
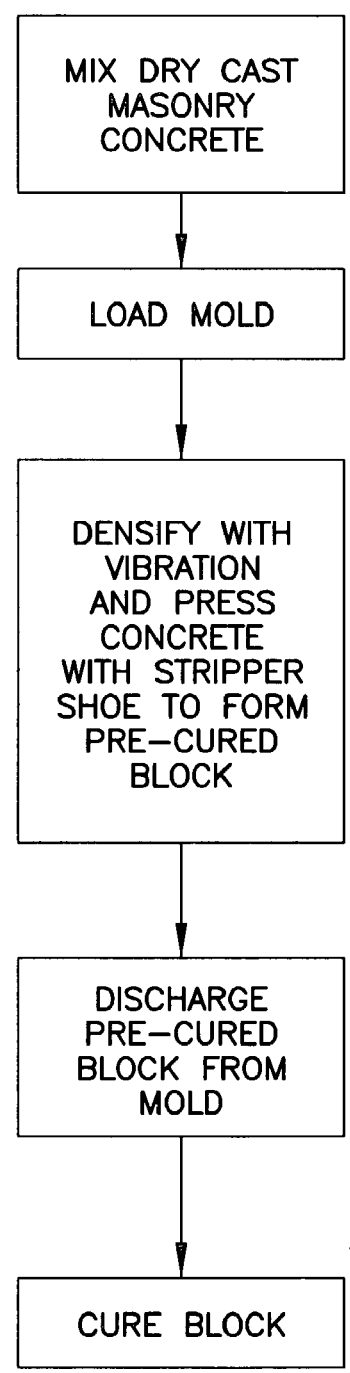
FIG. 5 is a flow chart illustrating the process of forming the block of the present invention.

An additional aspect of the invention concerns the process for forming the block 10. With reference to FIG. 5, an outline of the process is shown. Generally, the process is initiated by mixing the dry cast concrete that will form the block 10. Dry cast, no slump concrete is well known in the art of retaining wall blocks. The concrete will be chosen so as to satisfy pre-determined strength, water absorption, density, shrinkage, and related criteria for the block so that the block will perform adequately for its intended use. A person having ordinary skill in the art would be able to readily select a material constituency that satisfies the desired block criteria. Further, the procedures and equipment for mixing the constituents of the dry cast concrete are well known in the art.

Once the concrete is mixed, it is transported to a hopper, which holds the concrete near the mold. As discussed below, the mold assembly 50 includes at least one block-forming cavity 56 suitable for forming the preferred block (see FIGS. 6–11). The cavity 56 is open at its top and bottom. When it is desired to form a block, a pallet is positioned beneath the mold so as to close the bottom of the cavity 56. The appropriate amount of dry cast concrete from the hopper is then loaded, via one or more feed drawers, into the block-forming cavity through the open top of the cavity 56. The process and equipment for transporting dry cast concrete and loading a block-forming cavity are well known in the art.

The dry cast concrete in the cavity 56 must next be compacted to densify it. This is accomplished primarily through vibration of the dry cast concrete, in combination with the application of pressure exerted on the mass of dry cast concrete from above. The vibration can be exerted by vibration of the pallet underlying the mold (table vibration), or by vibration of the mold box (mold vibration), or by a combination of both actions. The pressure is exerted by a compression head, discussed below, that carries one or more stripper shoes that contact the mass of dry cast concrete from above. The timing and sequencing of the vibration and compression is variable, and depends upon the characteristics of the dry cast concrete used and the desired results. The selection and application of the appropriate sequencing, timing, and types of vibrational forces, is within the ordinary skill in the art. Generally, these forces contribute to fully filling the cavity 56, so that there are not undesired voids in the finished block, and to densifying the dry cast concrete so that the finished block will have the desired weight, density, and performance characteristics.

Pressure is exerted by a stripper shoe 94 that is brought down into contact with the top of the dry cast concrete in the cavity 56 to compact the concrete. The stripper shoe 94 acts with the vibration to compact the concrete within the cavity 56 to form a solid, contiguous, pre-cured block. In the preferred embodiment, the stripper shoe also includes a three-dimensional pattern 96 on its face for producing a corresponding pattern on the resulting pre-cured block as the stripper shoe compacts the concrete. Preferably, the portion of the pre-cured block contacted by the patterned shoe face comprises the front face of the block.

After densification, the pre-cured block is discharged from the cavity. Preferably, discharge occurs by lowering the pallet 82 relative to the mold assembly, while further lowering the stripper shoe 94 through the mold cavity to assist in stripping the pre-cured block from the cavity. The stripper shoe is then raised upwardly out of the mold cavity and the mold is ready to repeat this production cycle.

If the block is to have one or more converging side walls, then corresponding mold side walls, as described in detail below, must be provided in the mold. Such mold side walls must be adapted to move into a first position to permit filling of the mold, and compaction and densification of the dry cast concrete, and must be adapted to move into a second position to permit stripping of the mold without damage to the pre-cured block.

Once the pre-cured block has been completely removed from the cavity, it can be transported away from the mold assembly for subsequent curing. The block may be cured through any means known to those of skill in the art. Examples of curing processes that are suitable for practicing the invention include air curing, autoclaving, and steam curing. Any of these processes for curing the block may be implemented by those of skill in the art.

Once cured, the blocks can be packaged for storage and subsequent shipment to a jobsite, and can then be used with other cured blocks in forming a structure, such as the retaining wall 40 in FIG. 4.

Mold Assembly

The mold assembly 50 according to the present invention that is used to practice the invention is illustrated in FIGS. 6–11. The mold assembly 50 is made from materials that are able to withstand the pressure that is applied during formation of the pre-cured block, as well as provide sufficient wear life.

The mold assembly 50 is constructed so that the pre-cured block is formed with its front face facing upward, and with its rear face supported on the pallet 82 positioned underneath the mold assembly 50. This permits pattern impressing or other direct processing to occur on the front face 12 of the block, to allow the formation of pre-determined block front faces. Pre-determined front faces can include front faces having pre-determined patterns and textures, front faces having pre-determined shapes, front faces made from different material(s) than the remainder of the block, and combinations thereof.

Further, the mold assembly 50 is designed so that a pre-cured block, including a block with a lower lip or flange and/or one or more converging side faces, can be discharged through the bottom of the mold assembly.

Figure 6:
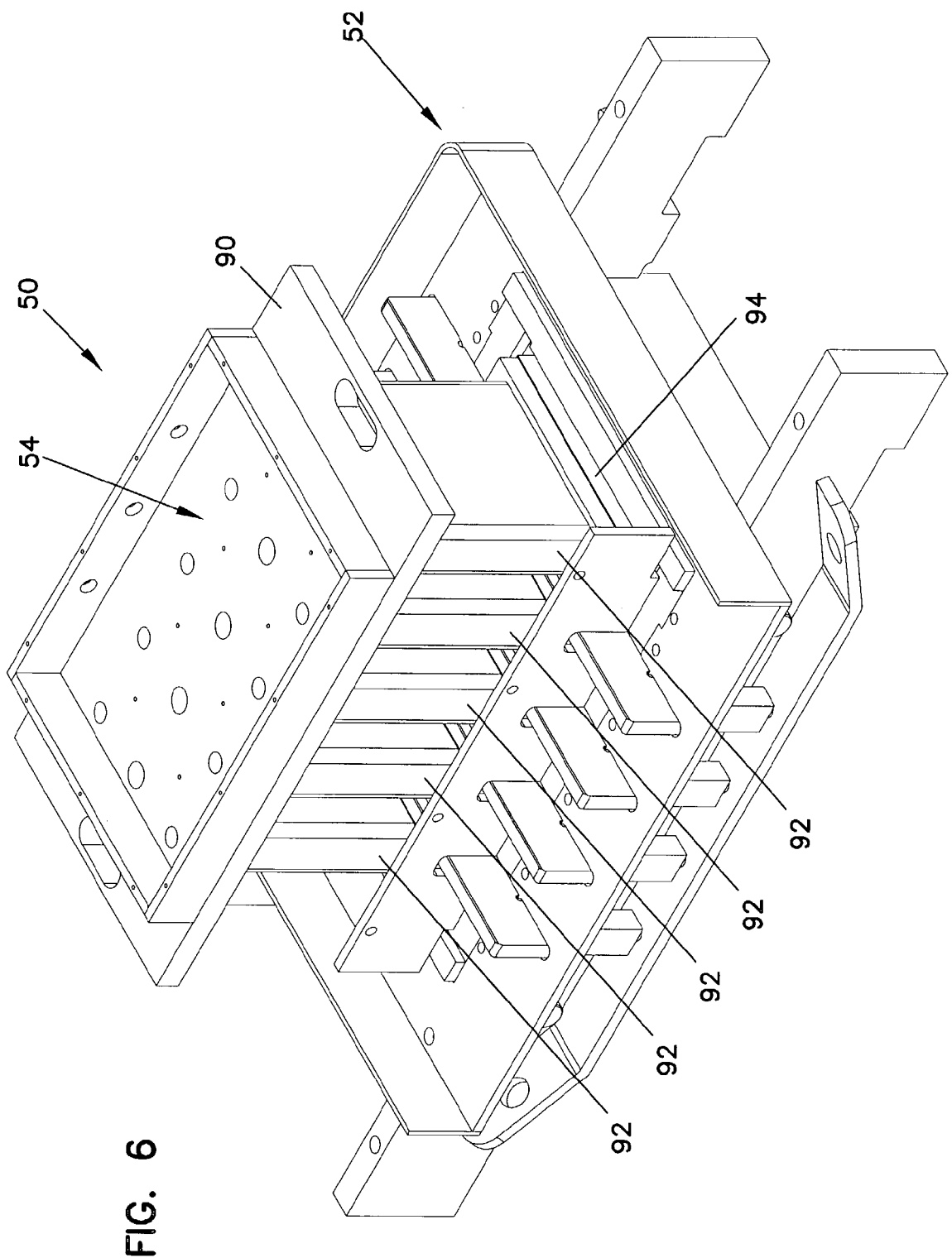
FIG. 6 is a perspective view of a mold assembly having a plurality of mold cavities for forming a plurality of retaining wall blocks of the present invention utilizing the process of the present invention.
Figure 7:
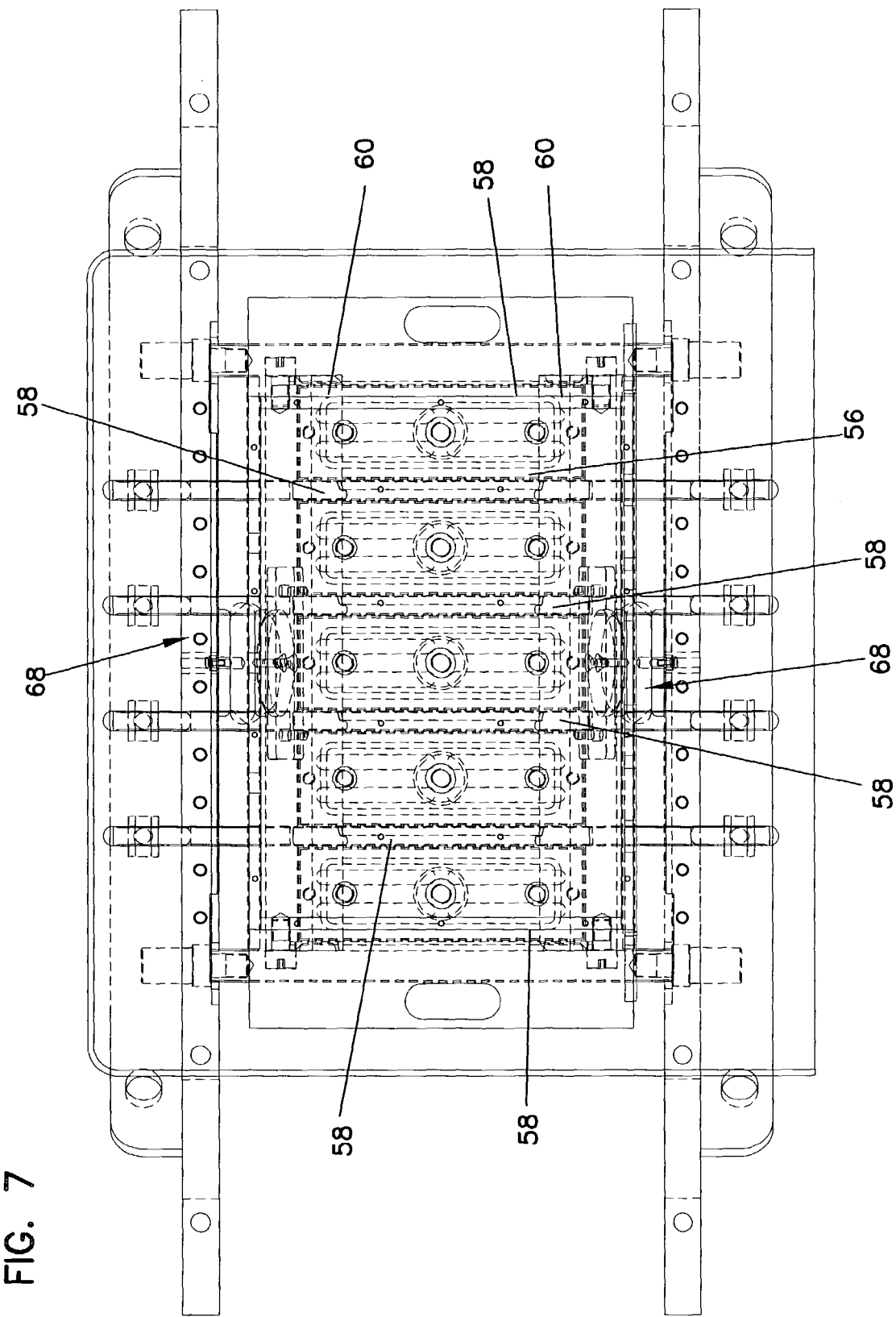
FIG. 7 is a top plan view of the mold assembly of FIG. 6.

Referring to FIG. 6, the mold assembly 50 comprises a mold 52 and a compression head assembly 54 that interacts with the mold 52 as described below. The mold 52 comprises at least one block-forming cavity 56 defined therein. In one preferred embodiment, the mold 52 is sized for use in a standard, "three-at-a-time" American block machine, having a standard pallet size of approximately 18.5 inches by 26.0 inches, which is sized for making three blocks with their upper faces on the pallet. The mold 52 comprises a plurality of generally identical block-forming cavities 56. FIG. 7 illustrates five block-forming cavities 56 arranged side-by-side, which is possible when making the preferred size blocks on a standard "three-at-a-time" pallet. Of course, larger machines that use larger pallets are in use, and this technology can be used in both larger and smaller machines. The number of possible mold cavities in a single mold depends upon size and/or type of the machine and the size of the pallet. A plurality of block-forming cavities 56 allows increased production of blocks from the single mold 52.

With reference to FIG. 7, the cavities 56 are formed by division plates 58, including a pair of outside division plates, a plurality of inside division plates, and a pair of end liners 60 that are common to each cavity 56. The use of outside and inside division plates and end liners to form a block-forming cavity in a mold is known to those of skill in the art. The division plates and end liners form the boundaries of the block cavities and provide the surfaces that are in contact with the pre-cured blocks during block formation, and are thus susceptible to wear. Thus, the division plates and end liners are typically mounted for removal within the mold 52 so that they can be replaced as they wear or if they become damaged. The techniques for mounting division plates and end liners in a mold to form block cavities, and to permit removal of the division plates and end liners, are known to those of skill in the art.

In the preferred embodiment, the division plates 58 form the upper and lower faces 16, 18 of the blocks 10, while the end liners 60 form the side faces 20, 22. For convenience, the division plates and end liners will hereinafter (including in the claims) be referred to collectively as the side walls of the cavities. Thus, side walls refers to division plates and end liners, as well as to any other similar structure that is used to define the boundaries of a block-forming cavity.

Figure 8:
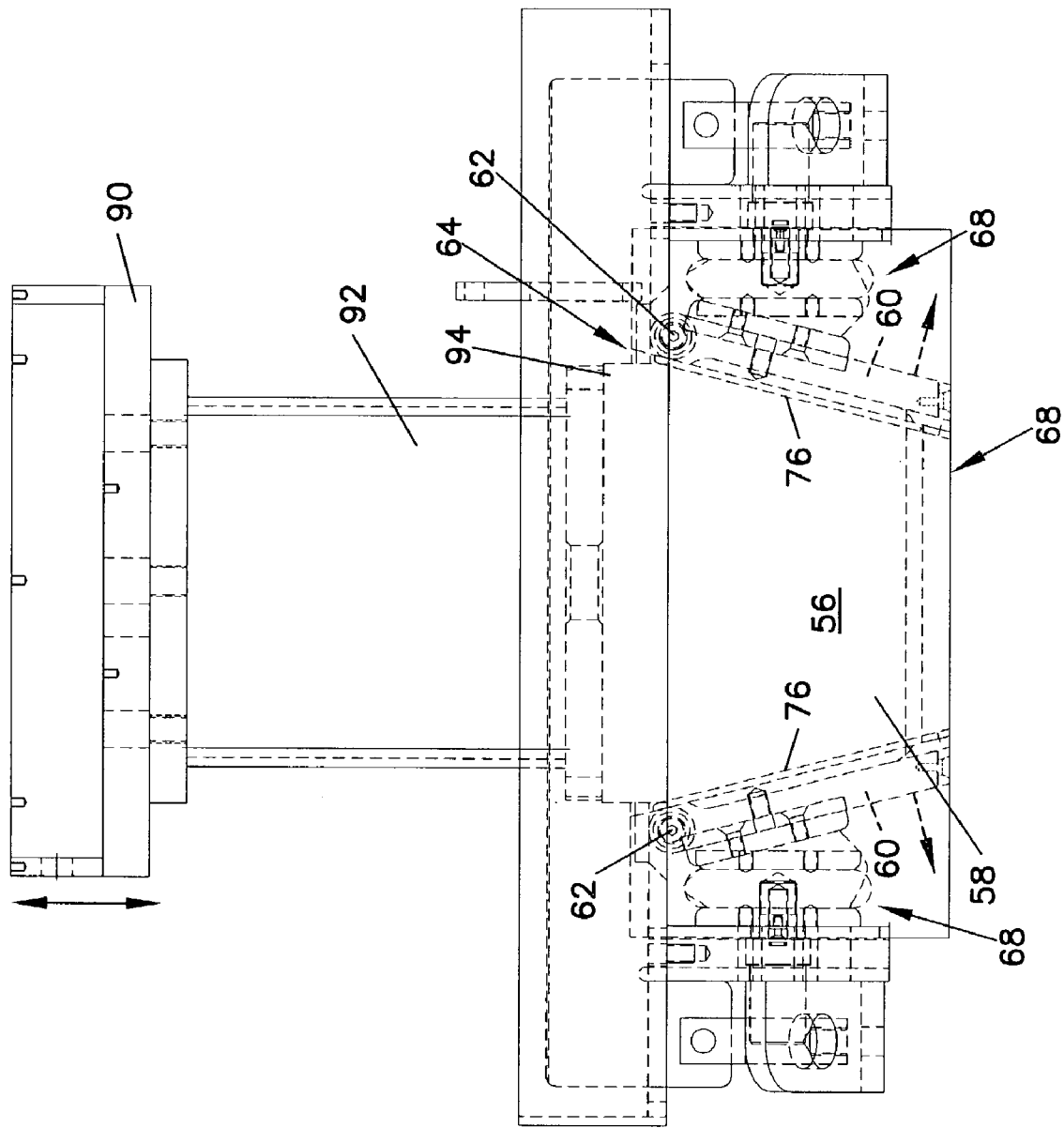
FIG. 8 is an end view of the mold assembly illustrating one mold cavity with opposed, converging, pivoted side walls.

Referring now to FIG. 8, a portion of a single block-forming cavity 56 is illustrated. The cavity 56 defined by the side walls 58, 60 has an open top 64 and an open bottom 66. As shown, the top ends of the side walls 60 (e.g. the end liners) are connected by pivots 62 to suitable surrounding structure of the mold 52 to allow the side walls 60 to pivot between the closed position shown in FIG. 8, where the side walls 60 converge toward each other, to a retracted position where the side walls 60 are generally vertical and parallel to each other (not shown). In the retracted position, the bottom of the cavity 66 is at least as wide as the top of the mold cavity, which allows the pre-cured block to be discharged through the open bottom. When only a portion of either side face 20, 22 of the block converges, only a corresponding portion of the side walls 60 will be pivoted. The side wall 58 that forms the lower face of the block 10 is also illustrated in FIG. 8, while the other side wall 58 that forms the upper face of the block is not shown.

Pivoting of the side walls 60 is required in order to form the preferred block 10. As discussed above, the block 10 is formed "face-up" in the mold 52 with its converging side faces formed by the side walls 60. Thus, the converging side walls 60, when they are angled as illustrated in FIG. 8, shape the converging side faces 20, 22 of the pre-cured block. However, the front portion of the pre-cured block is wider than the rear portion of the block. In order to be able to discharge the pre-cured block through the open bottom 66, the side walls 60 must pivot outward to enable downward movement of the pre-cured block through the open bottom.

Biasing mechanisms 68 are provided to maintain the side walls 60 at the converging position during introduction of the concrete and subsequent compacting of the dry cast concrete, and which allow the side walls 60 to pivot to a vertical position during discharge of the pre-cured block. Preferably, a single biasing mechanism 68 is connected to each side wall 60 that is common to all cavities 56, so that the movement of each side wall 60 is controlled via a common mechanism (see FIG. 7). Alternatively, separate biasing mechanisms can be provided for each cavity. The biasing mechanisms 68 are illustrated as comprising air bags, which will be controlled through the use of air or similar gas. Suitable inlet and outlet ports for the air will be provided, as will a source of high pressure air. The use of biasing mechanisms other than air bags is also possible. For example, hydraulic or pneumatic cylinders could be used.

When pressurized with air, the air bags will force the side walls 60 to the position shown in FIG. 8. When it comes time to discharge the pre-cured block(s), the pressurized air is vented from the air bags, which allows the side walls 60 to pivot outward under force of the pre-cured block as the pre-cured block is discharged through the open bottom when the pallet is lowered. During block discharge, the side walls 60 remain in contact with the side faces of the pre-cured block. Alternatively, biasing mechanisms, such as coil springs, can be connected to the side walls 60 to force the side walls to the retracted position when the air bags are vented. In this case, as the pallet 82 starts to lower to begin block discharging, the side walls 60 will be forced to the retracted position, and the side walls 60 will not contact the side faces of the block during discharge. After discharge, the side walls 60 are returned to the closed, angled position by re-pressurizing the air bags.

Rather than pivoting the side walls 60, it is possible to use other mechanisms to permit movement of the side walls 60 to allow discharge of the pre-cured block. For example, the side walls 60 could be mounted so as to slide inwards to the position shown in FIG. 8 and outwards to a position where the bottom of the cavity 56 is at least as wide as the top of the mold cavity. The sliding movements could be implemented using a track system in which the side walls are mounted.

As shown in FIG. 8, each side wall 60 includes a shaping surface 76 that faces the cavity 56. The shaping surfaces 76 are substantially planar. The result is the formation of substantially planar side faces 20, 22 of the block 10.

Figure 9:
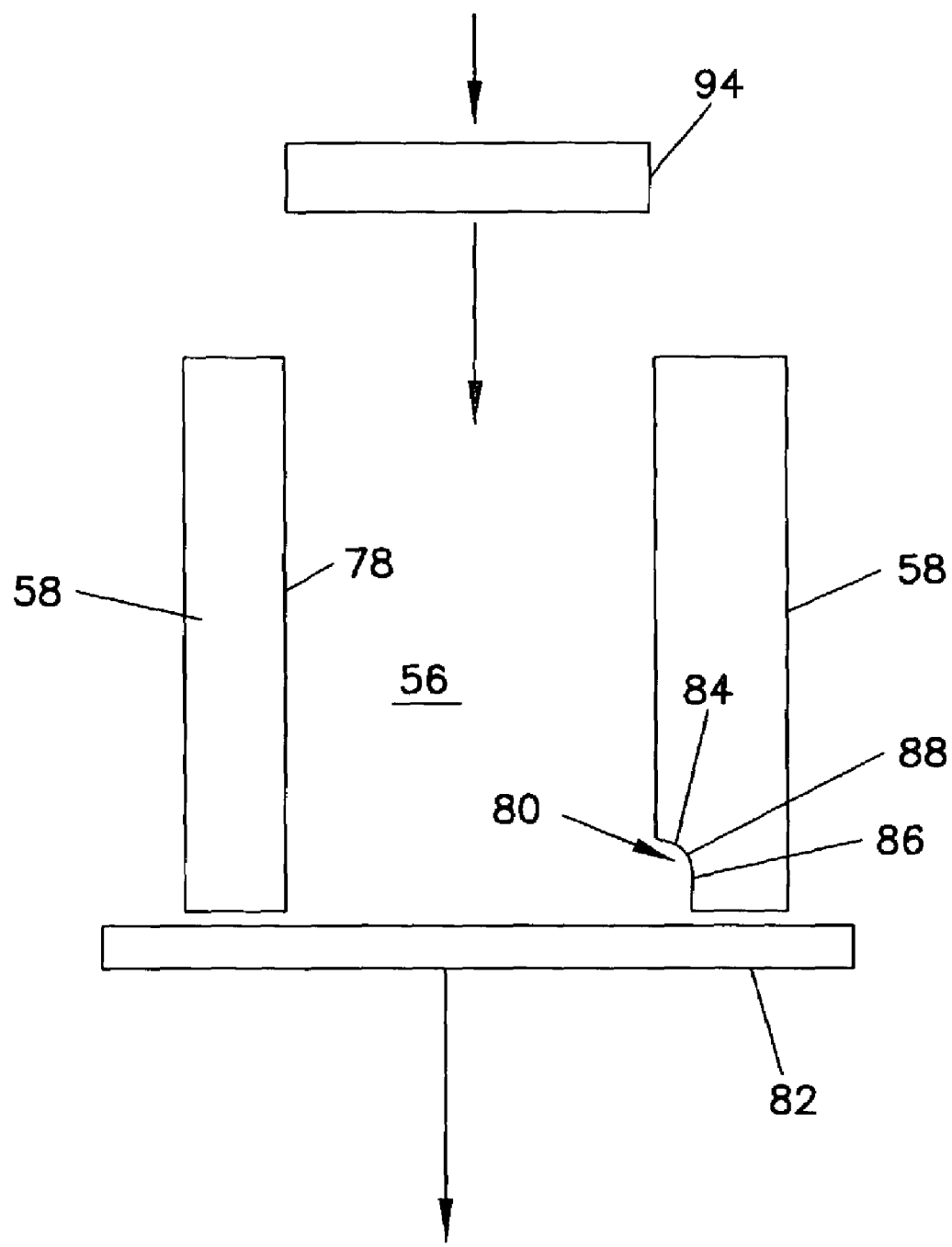
FIG. 9 is a schematic representation of the side walls that form the upper and lower block faces, the stripper shoe, and the pallet of the mold assembly.
Figure 10A:
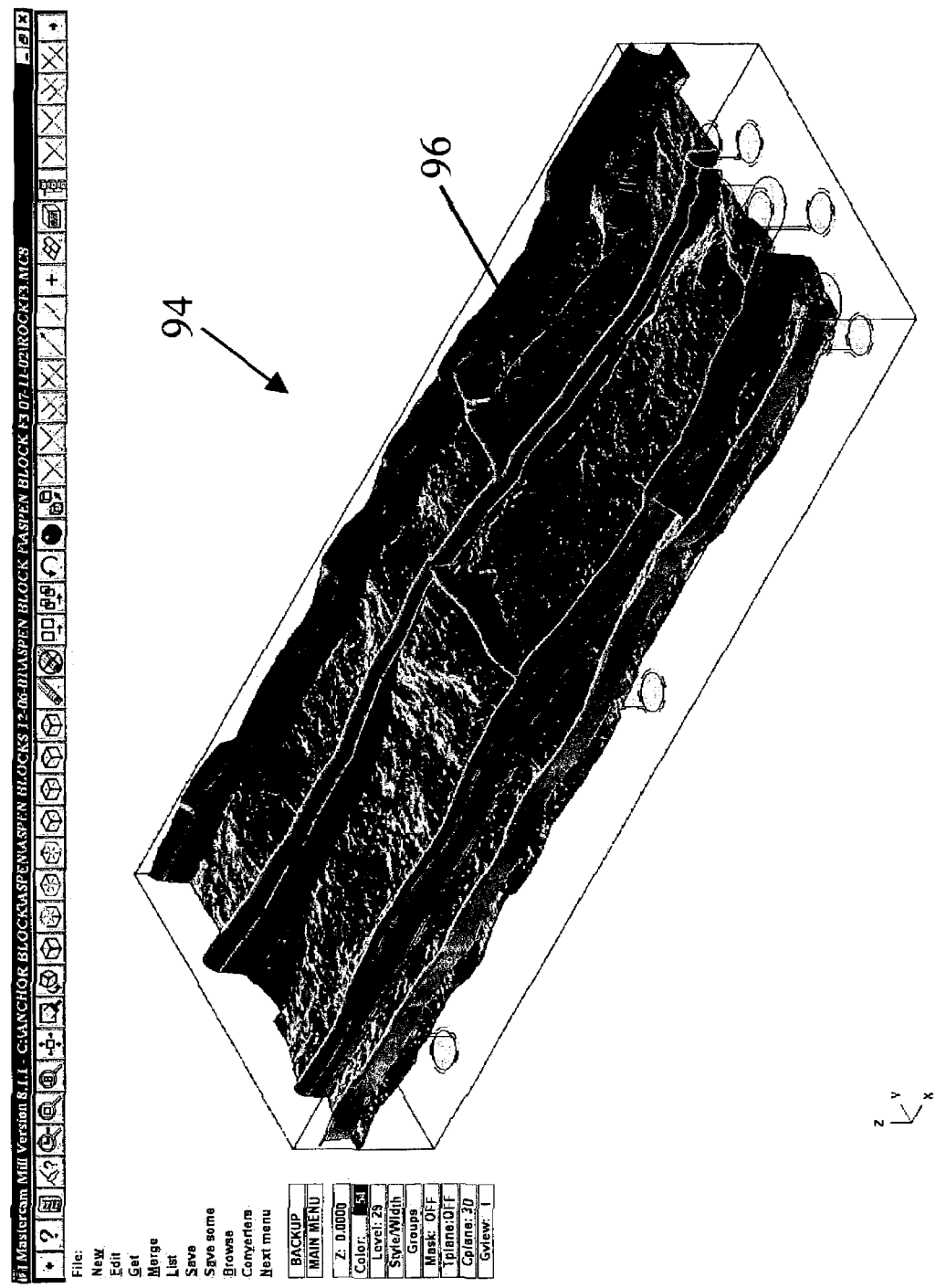
FIGS. 10A, 10B, 10C, 10D, 10E and 10F are digital renditions of representative patterns on the faces of stripper shoes according to the present invention.
Figure 10B:
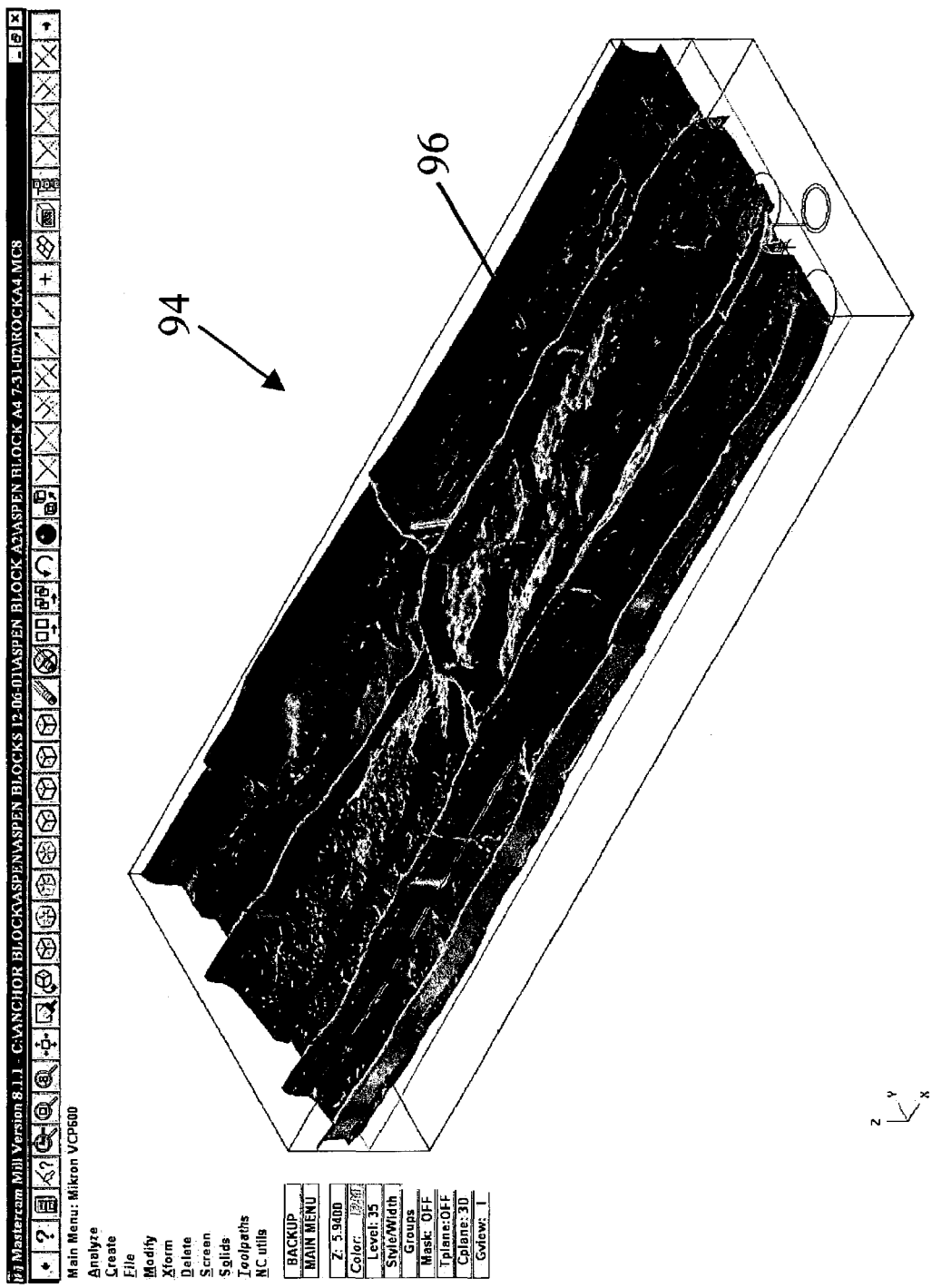
Figure 10C:
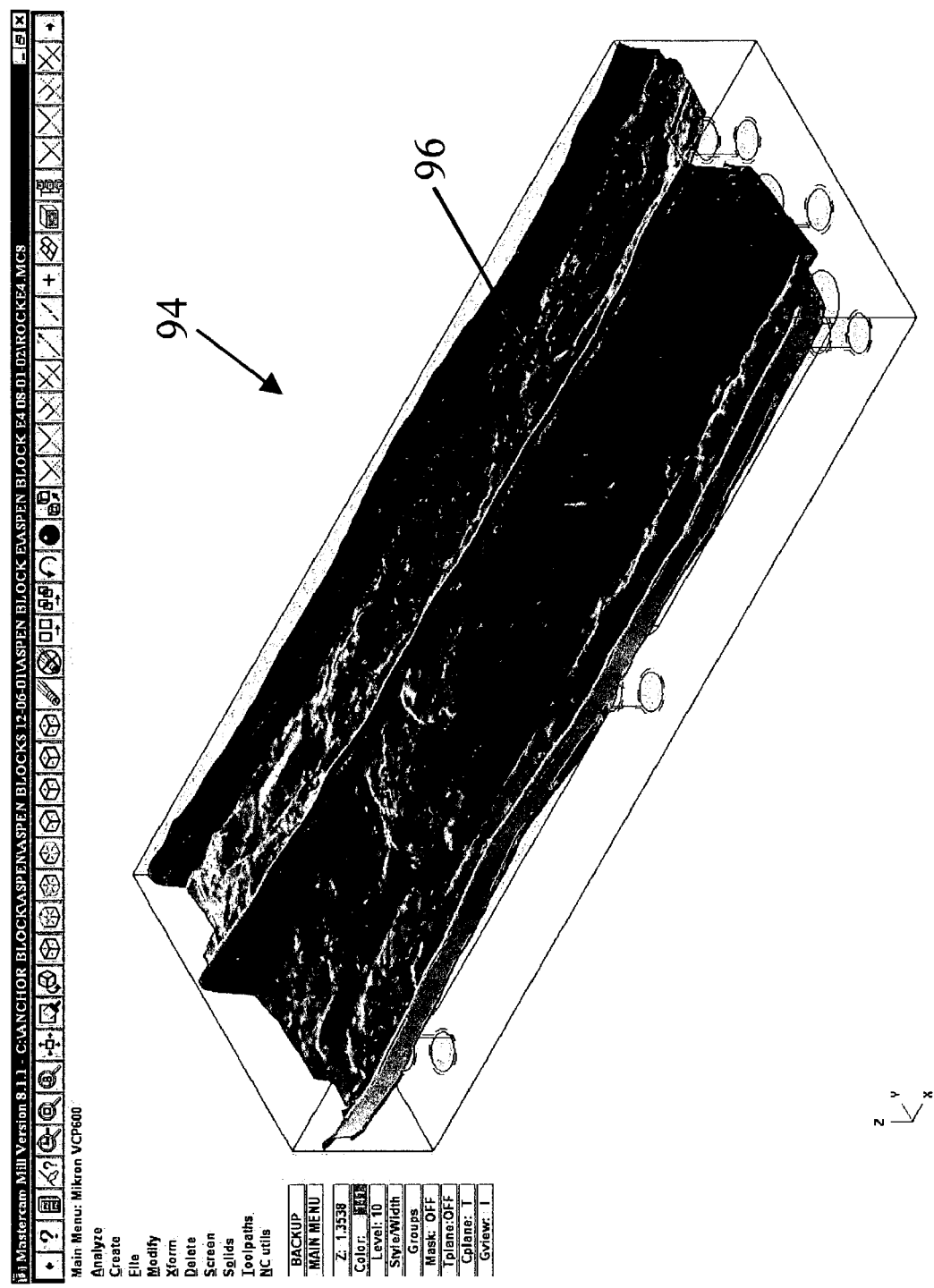
Figure 10D:
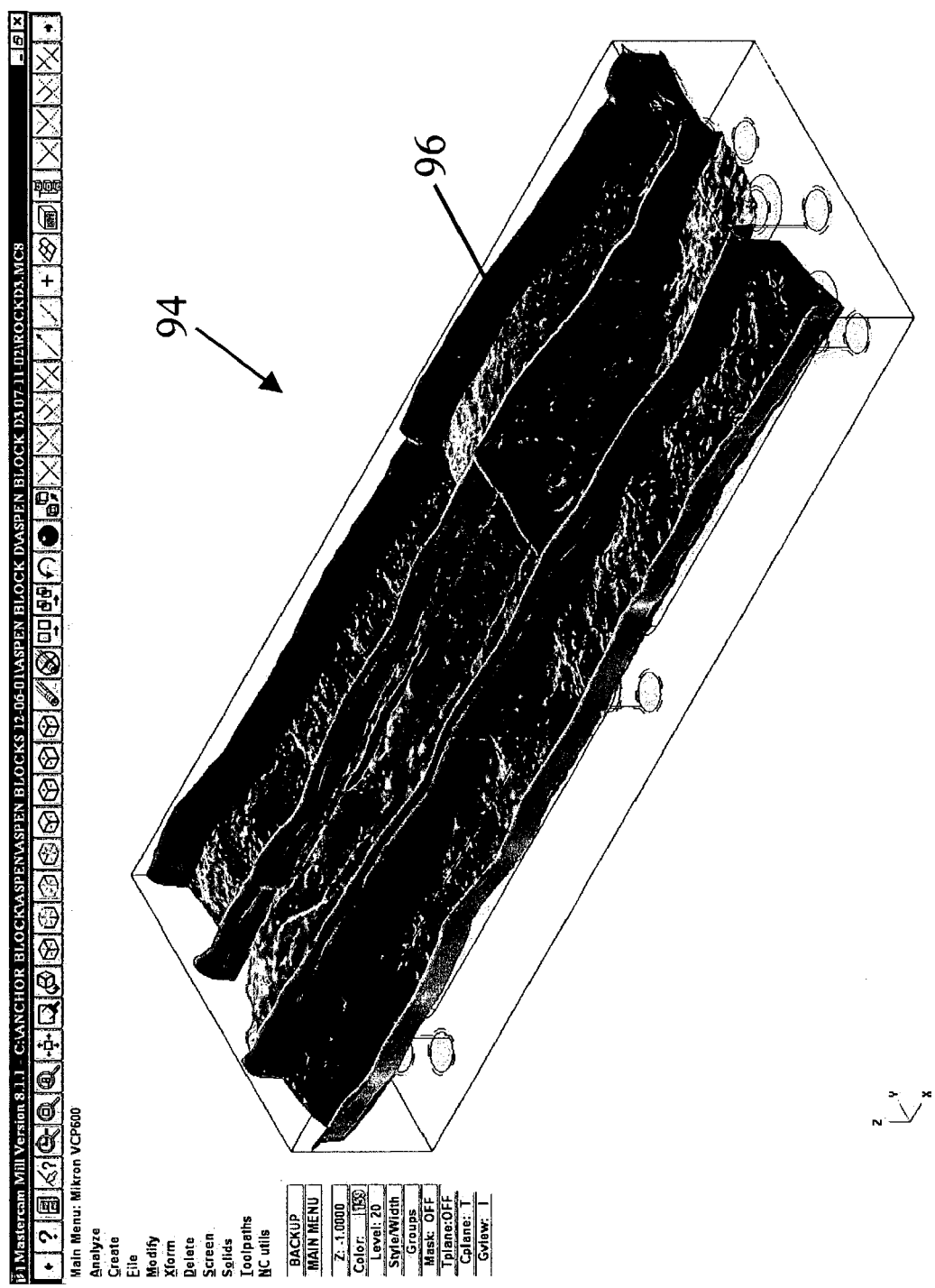
Figure 10E:
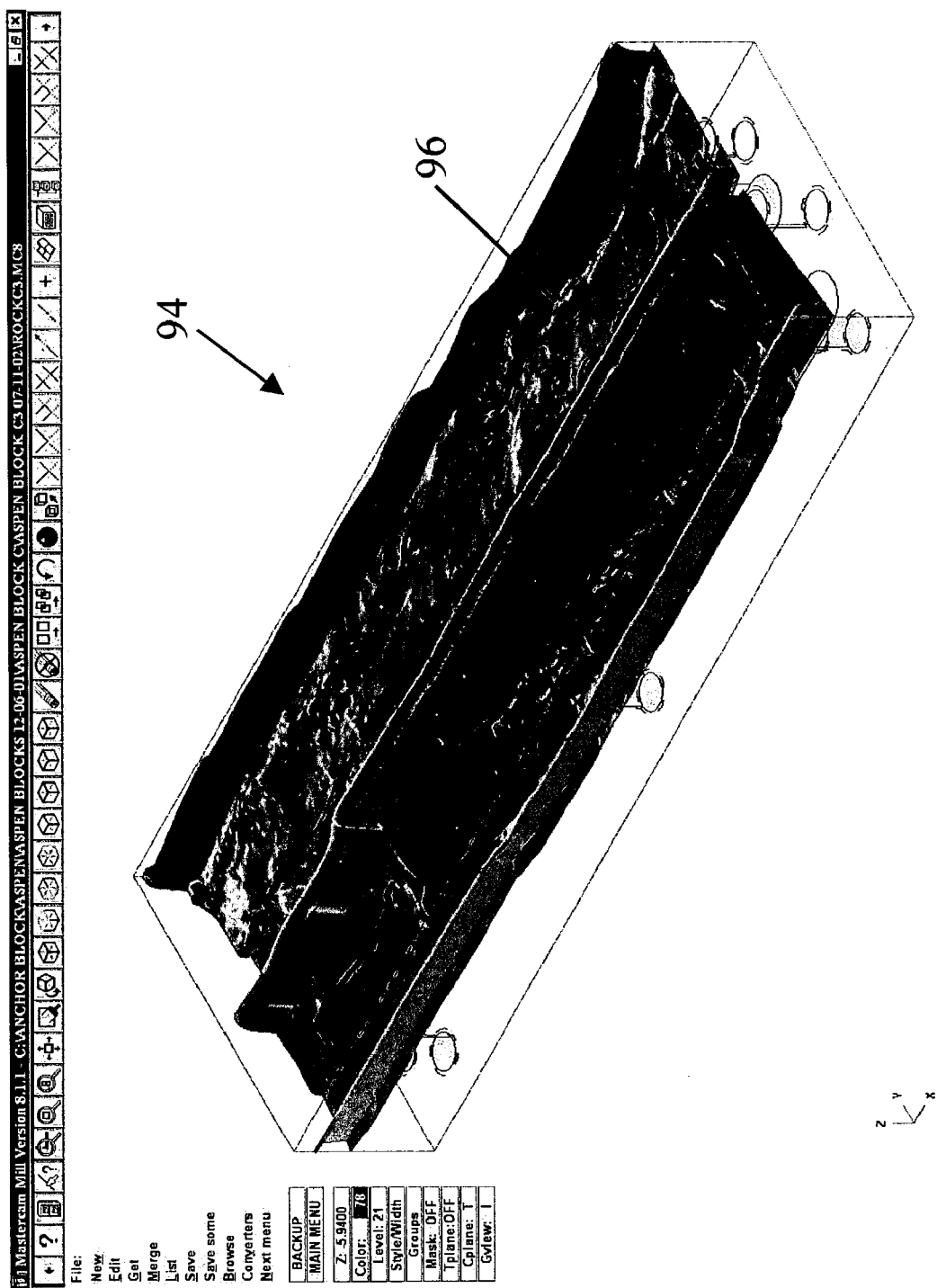
Figure 10F:
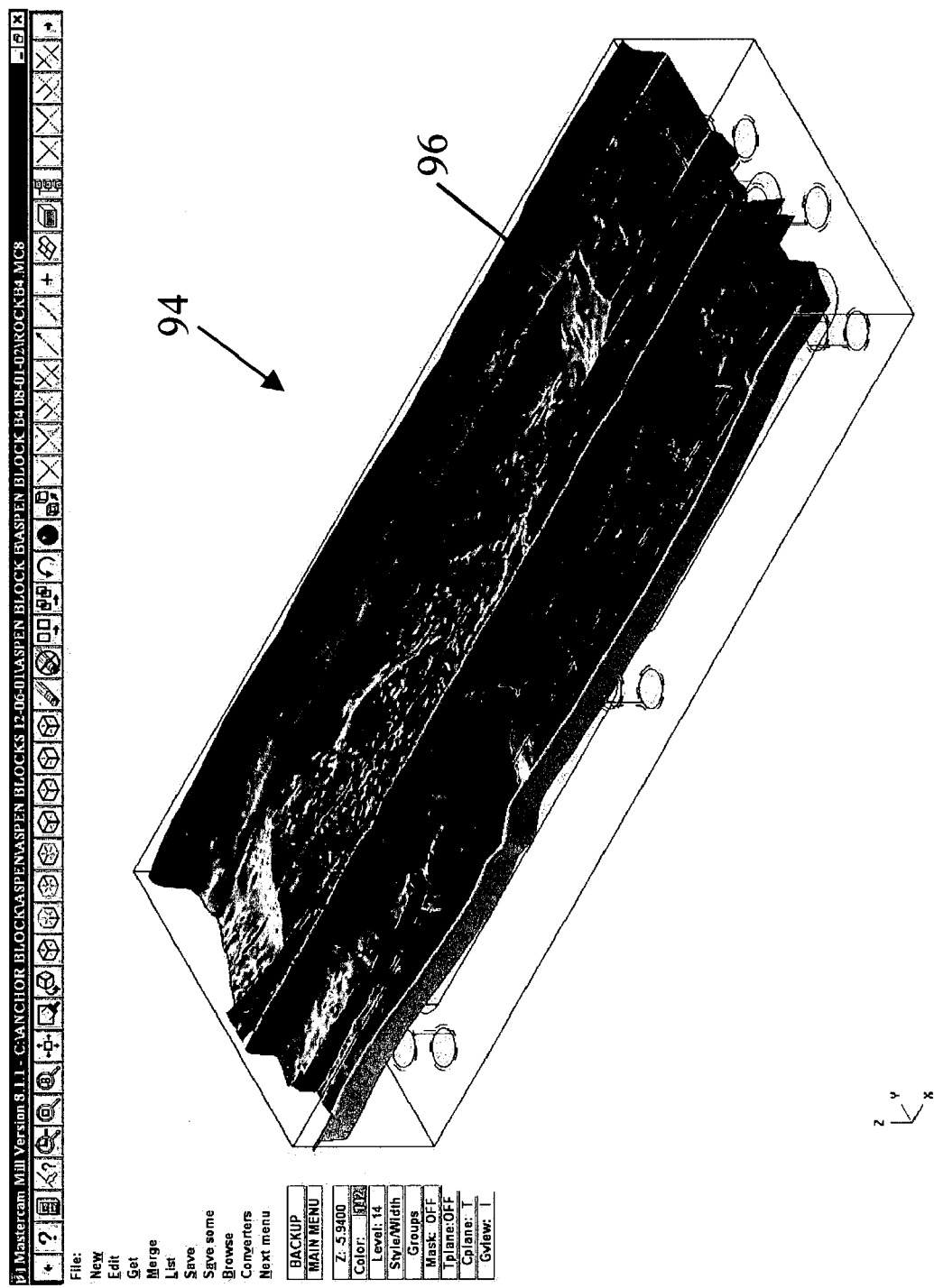

Referring now to FIG. 9, the side walls 58 that form the upper and lower faces 16, 18 of the block 10 are illustrated. The side walls 58, which are fixed and not moveable during the molding process, are substantially vertical.

The side wall 58 that forms the upper face 16 (the left side wall 58 in FIG. 9) includes a shaping surface 78 that faces the cavity 56. The surface 78 is substantially planar, which results in the formation of a substantially planar upper face 16.

The side wall 58 that forms the lower face 18 (the right side wall 58 in FIG. 9) includes an undercut, or "instep," portion 80 at the bottom edge thereof adjacent the open bottom 66. The undercut portion 80, in combination with the pallet 82 that is introduced under the mold 52 to temporarily close the open mold bottom 66 during the molding process, defines a flange-forming subcavity of the cavity 56. The flange-forming subcavity has a shape that results in the formation of the flange 26 on the block 10.

In particular, the undercut portion 80 includes a shaping surface 84 that forms the front surface 28 of the flange 26, a shaping surface 86 that forms the bottom surface 30 of the flange, and a shaping surface 88 that forms the edge 32 of the flange 26. The portion of the flange 26 that is an extension of the rear face 14 is formed by and on the pallet 82, along with the remainder of the rear face 14. The shape of the surfaces 84 and 86 facilitate filling of the undercut portion 80 with the concrete during introduction and subsequent compacting of the concrete so that the flange 26 is completely formed, as well as aid in release of the flange 26 from the surfaces 84, 86 during block discharge.

In the case of a block having a flange on the lower face and no converging side faces, the side walls 60 would be oriented vertically instead of being converging. Further, in the case of a block without a flange on the lower face and with converging side faces, the undercut 80 would not be present. In the case of a block without a flange on the lower face and without converging side faces, the undercut 80 would not be present and the side walls 60 would be oriented vertically.

Returning to FIGS. 6 and 8, the head assembly 54 is seen to include a compression head 90 in the form of a plate. The head 90 is actuated by an actuating mechanism in a manner known in the art so that the head 90 is moveable vertically up and down to bring about compaction of the dry cast concrete in the mold cavities 56 and to assist in stripping the pre-cured blocks from the mold 52.

Connected to and extending from the bottom of the head 90 is a plurality of stand-offs 92, one stand-off for each block-forming cavity 56 as shown in FIG. 6. The stand-offs 92 are spaced from each other, with the longitudinal axis of each stand-off oriented perpendicular to the plane of the head 90 and extending generally centrally through the block-forming cavity 56.

Stripper Shoe

A stripper shoe 94, illustrated in FIGS. 6, 8, 9 and 11, is connected to the end of each stand-off 92. The stripper shoe 94 is rectangular in shape and is dimensioned so that it may enter the respective cavity 56 through the open top to contact the concrete to compact the concrete, and to travel through the cavity during discharge of the pre-cured block. The dimensions of the stripper shoe 94 are only slightly less than the dimensions of the open top 64 of the cavity 56, so that the shoe 94 fits into the cavity 56 with little or no spacing between the sides of the shoe 94 and the side walls 58, 60 defining the cavity. This minimizes escape of concrete between the sides of the shoe 94 and the side walls 58, 60 during compression, and maximizes the front face area of the block that is contacted by the shoe 94.

Figure 11:
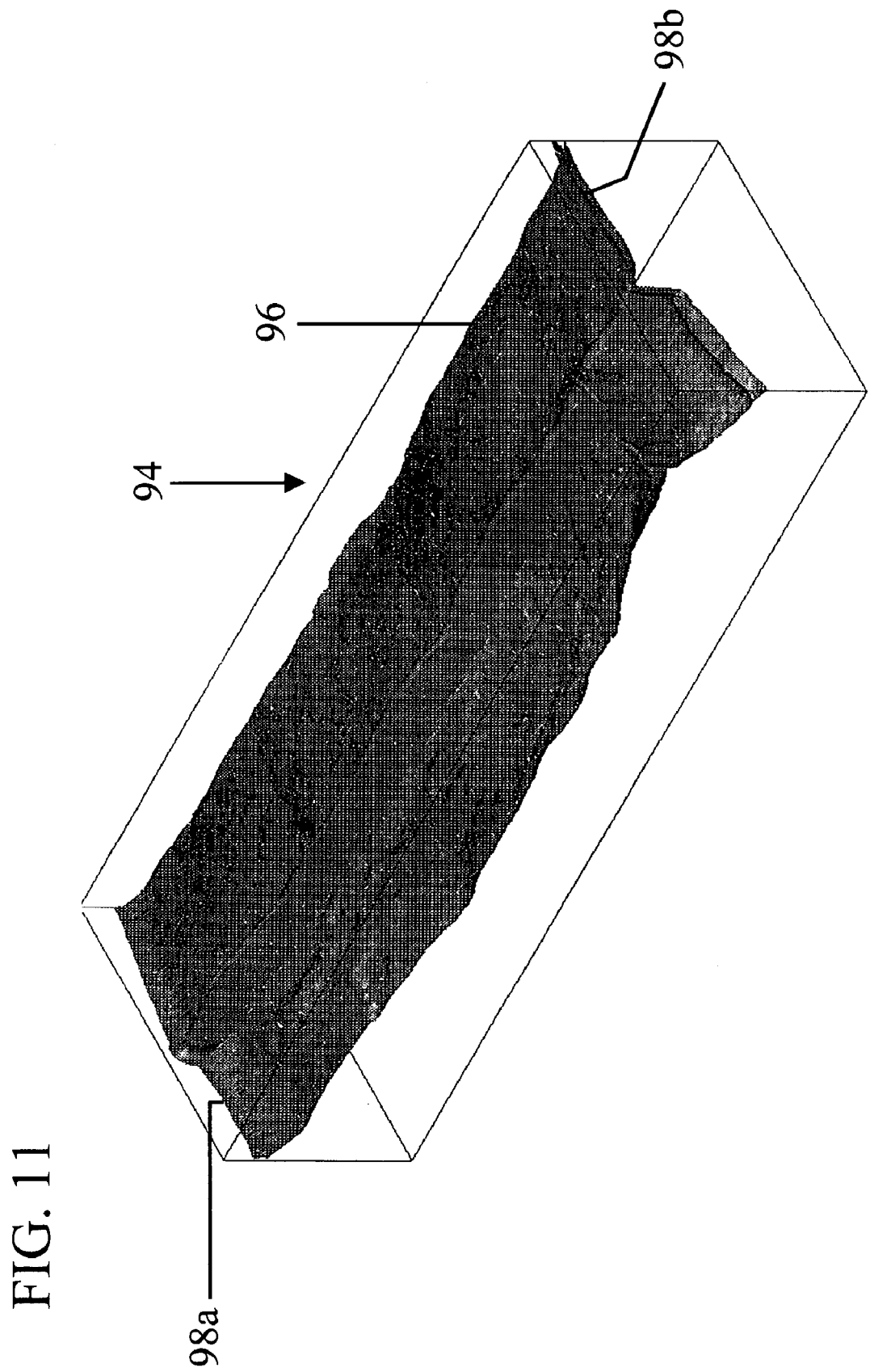
FIG. 11 is a perspective view of a representative pattern on the face of a stripper shoe.

Flanges 98a, 98b are formed on opposite ends of the face of the stripper shoe 94, as best seen in FIG. 11. The flanges 98a, 98b are arcuate to produce the rounded edges 24a, 24b on front face 12 of the block. If desired, arcuate flanges can be provided on the two remaining ends of the stripper shoe 94, in order to produce upper and lower rounded edges on the front face 12.

As discussed above, a face of the shoe 94 is preferably provided with a pre-determined pattern 96 that is a reverse image of a desired surface or surfaces. As the shoe 94 including the pattern 96 compacts the concrete, the pattern is imparted to the front face of the block. The pattern 96 preferably simulates natural stone, so that the front face of the resulting block simulates natural stone thereby making the block appear more natural and "rock-like." A variety of different patterns 96 can be provided on the shoe 94, depending upon the appearance of the front face that one wishes to achieve. In addition to, or separate from, the pattern 96, the face of the shoe 94 can be shaped to achieve a faceted or curved block front face. Indeed, the face of the shoe 94 can be patterned and/or shaped in any manner which one desires in order to achieve a desired appearance of the block front face.

FIGS. 10A–F and 11 provide examples of patterns 96 that can be provided on the shoe 94. The patterns 96 simulate naturally occurring objects, such as, for example, natural stone or man made objects. The pattern 96 is preferably machined into the shoe face based upon a pre-determined three-dimensional pattern. An exemplary process for creating the pre-determined pattern 96 on the shoe face follows.

Figure 12:
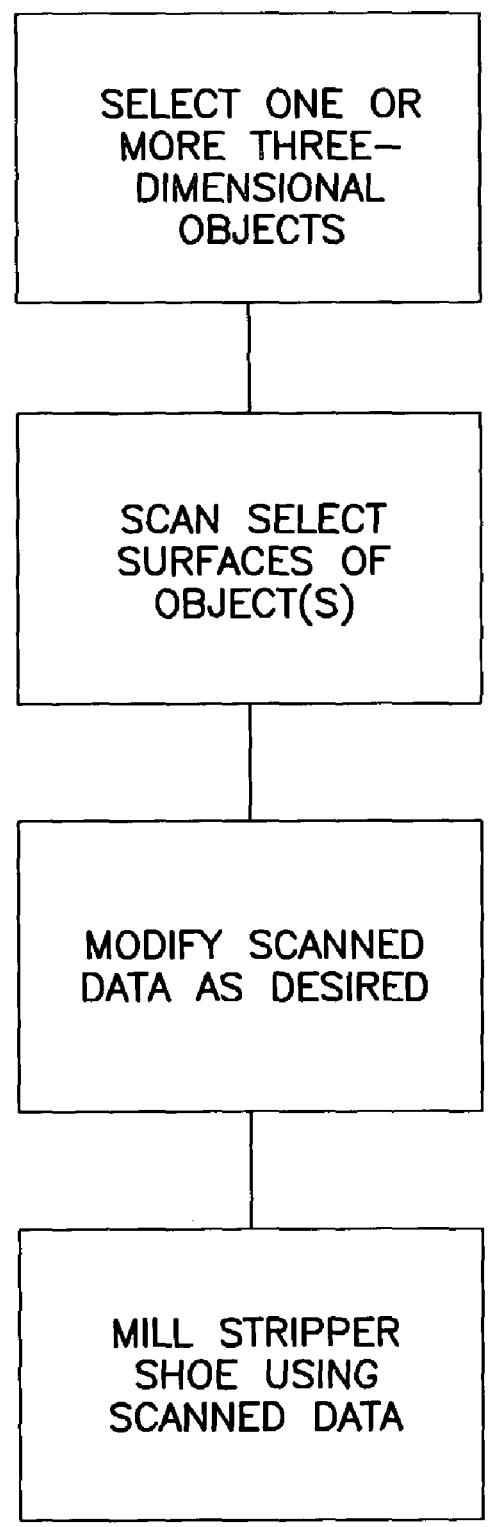
FIG. 12 is a flow chart illustrating the process of forming a stripper shoe face of the present invention.

Referring now generally to FIG. 12, initially, one or more objects are selected. For example, the objects may include one or more natural rocks having surfaces which one considers to be visually pleasing. Other natural or man made objects may also be used.

One or more of the rock surfaces are then scanned using a digital scanning machine. An example of a suitable scanning machine for practicing the invention is the Laser Design Surveyor® 1200 having an RPS 150 head, available from Laser Design Incorporated of Minneapolis, Minn. The Laser Design Surveyor® 1200 has a linear accuracy of 0.0005 inch in the XYZ coordinates, and a resolution of 0.0001 inch. As practiced, data is collected at 256 points for every 0.004 inch of the one or more rock surfaces being scanned. The rock surfaces may be scanned at as many angles as necessary to collect data on all surfaces.

Once the scanned data has been collected, various techniques can be used to manipulate the data. Initially, the Laser Design Surveyor® utilizes DataSculpt® software, available from Laser Design, Inc. of Minneapolis, Minn., to generate one or more DataSculpt® point clouds, or data sets including data points positioned in X, Y, and Z coordinates, from the scanned data.

A computer-aided design (CAD) package is then used to trim the point clouds. The point clouds are also sampled to reduce the scanned data to a manageable size, while smoothing the data by removing extraneous points and noise. Next, the data from the point clouds are blended to form a finished point cloud. The finished point cloud is converted to a polygonal mesh, or a three-dimensional rendition of the point cloud using polygonal shapes. The edges of the polygonal mesh are trimmed to form a clean line, and boundaries are applied to form a tight mesh pattern. Using the mesh, grids are applied and converted to a Non-Uniform Rational B-Splines (NURBS) surface.

The resulting digital image is displayed (see, e.g., FIGS. 10A–F). The user can manipulate the digital image by selecting and modifying one or more points on the digital image in the X, Y, and/or Z directions. Next, the data is scaled and/or trimmed to an overall block dimension, in the illustrated embodiment 3.88 inches by 11.88 inches per print. In addition, the data is modified to meet a ¾ inch maximum difference in face relief, a 0–10 degree face angle from the lower edge of the face to the upper edge of the face, and a 5–10 degree draft for all interior surfaces of the relief. Next, the complete data file is mirrored to create the reverse image needed to create the stripper shoe 94. The data can be output in an Initial Graphics Exchange Specification (IGES) format to a CAD system described below.

A CAD system suitable for manipulating the scanned data is the Mastercam® Mill Version 8.1.1, available from CNC Software, Inc. of Tolland, Conn.

The data, in IGES format, is then input into preferably a three axis (or four axis), numerically controlled milling machine for milling of the stripper shoe 94. The data is converted into toolpaths by the milling machine. Using the toolpaths, the milling machine mills a mirror image of the rock surface into the face of the stripper shoe 94.

To create the illustrated stripper shoes, the milling machine can perform a series of toolpaths, including: (1) a first toolpath with a ½ inch diameter flat bottom endmill doing a parallel pocket at 90 inches per minute (IPM) and 7,000 revolutions per minute (RPM); (2) a second toolpath with a ¼ inch diameter flat bottom endmill doing a surface contour at 100 IPM and 10,000 RPM; (3) a third toolpath with a ¼ inch diameter ball endmill doing a 45° surface contour at 100 IPM and 12,000 RPM; and (4) a fourth toolpath with a ⅛ inch diameter ball endmill doing a 45° surface contour at 150 IPM and 14,000 RPM. The number and type of toolpaths may vary based on the complexity of the surface being reproduced.

A suitable milling machine for practicing the invention is the Mikron VCP600 available from Mikron AG Nidau of Nidau, Switzerland.

The result is a pattern milled into the face of the shoe 94 that is a mirror image of the desired pattern of a block. When the shoe 94 including the pattern compacts the concrete used to form the block, the pattern is impressed into the front face of the block. In the illustrated embodiments shown in FIGS. 10A–F and 11, the resulting three-dimensional pattern has a relief of between about 0.5 inch and about 1.0 inch, preferably no greater than about ¾ inch.

This process can be repeated to produce additional shoes having the same or different face patterns. This is advantageous because the patterned face of each shoe is subject to wear, and the shoe will need to be replaced when the pattern becomes excessively worn. Moreover, multiple shoes can be used for multiple molds. Further, by forming a variety of different pre-determined shoe patterns, a variety of different block front face appearances can be achieved. Other shoe patterns can be formed by combining the scanned surfaces of a plurality of different rocks. Exemplary shoe patterns are illustrated in FIGS. 10A–F and 11.

As discussed above, the resulting detail and relief that is provided on the block front face can be significantly greater than the detail and relief that is provided on the front face of a block that results from conventional splitting techniques, and the other front face distressing techniques discussed above. If desired, the scan data can be manipulated in order to increase or decrease the relief that is milled into the shoe face, which will alter the relief that is ultimately provided on the block front face.

It is known in the art that dry cast concrete may have a tendency to stick to mold surfaces, such as the patterned surface of the stripper shoe 94. Various techniques to enhance the release of the stripper shoe 94 from the dry cast concrete are known, and one or more of them may need to be employed in the practice of this invention. For example, the pattern formed on the stripper shoe has to be designed to enhance, rather than inhibit, release. In this regard, appropriate draft angles have to be employed in the pattern. As noted above, in the illustrated embodiment, a draft angle of 5° is used. The pattern-forming techniques described above permit manipulation of the scanned images to create appropriate draft angles. Release agents, such as a fine mist of oil, can be sprayed onto the stripper shoe between machine cycles. Head vibration can be employed to enhance release. And heat can be applied to the stripper shoe to enhance release. Heating mold components to prevent sticking of dry cast concrete is known in the art. In the present invention, due to the detailed pattern that is to be imparted to the block front face, it is even more important to prevent sticking. In particular, it is important to be able to control the temperature of the shoe so that the temperature can be maintained at selected levels.

Figure 13:
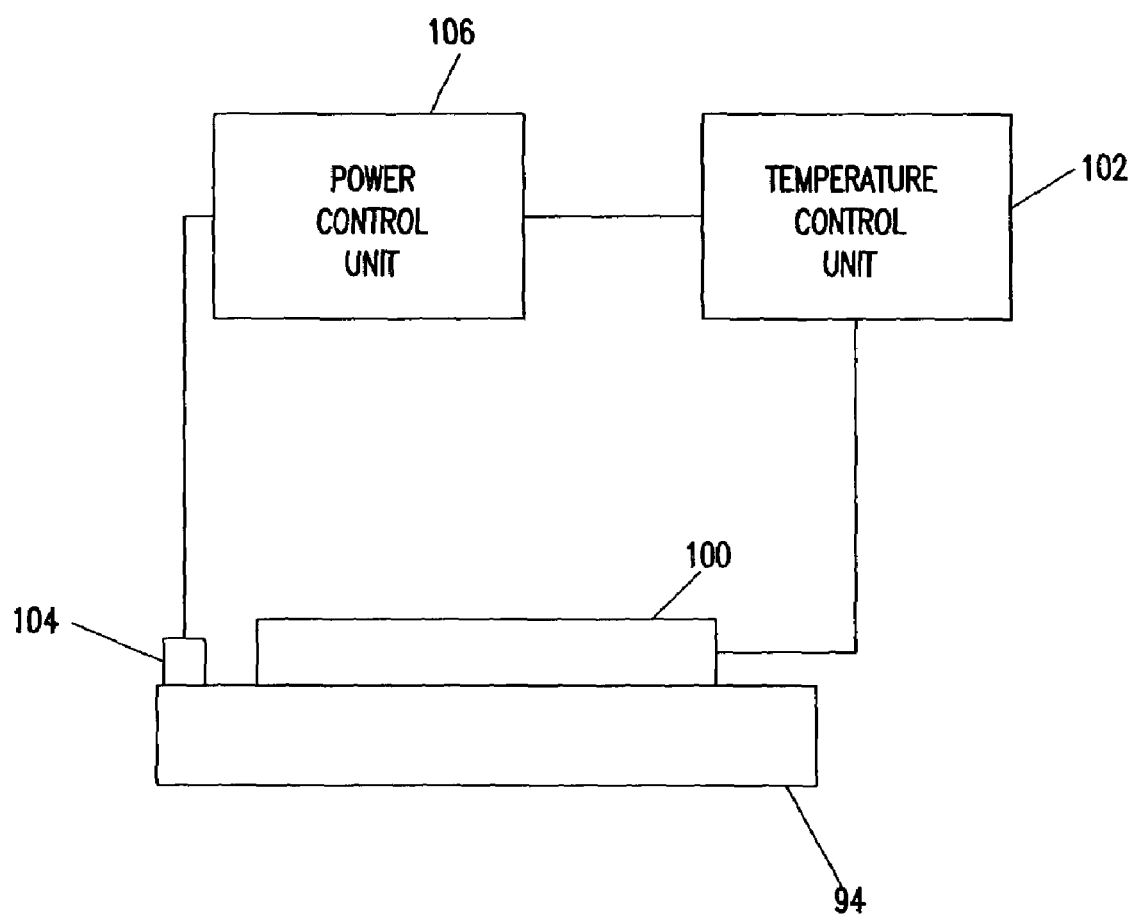
FIG. 13 is a schematic illustration of the temperature control for the stripper shoe.

Preferably, as shown diagrammatically in FIG. 13, a heater 100 is connected to the shoe 94 for heating the shoe. The heater 100 is controlled by a temperature control unit 102. A thermocouple 104 mounted on the shoe 94 senses the temperature of the shoe, and relays that information to a power control unit 106 that provides electrical power to the control unit 102 and the heater 100. The system is designed such that, when the temperature of the shoe 94 falls below a pre-determined level as sensed by the thermocouple 104, power is provided to the heater 100 to increase the shoe temperature. When the shoe temperature reaches a pre-determined level, as sensed by the thermocouple, the heater 100 is shut off. Thus, the shoe temperature can be maintained at selected levels. Preferably, the control unit 102 is designed to allow selection of the minimum and maximum temperature levels, based on the dry cast concrete that is being used. In the preferred embodiment, the surface temperature of the stripper shoe 94 is maintained between 120° F. and 130° F.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of making a concrete block having a three dimensional patterned face, comprising the steps of:
   selecting a three-dimensional pattern of one or more existing objects;
   digitally scanning the selected three-dimensional pattern to create scanned data in XYZ coordinates that is representative of the selected three-dimensional pattern;
   creating from the scanned data in the XYZ coordinates a digital data set that is representative of a desired three dimensional patterned face of the concrete block based on the scarned data of the three-dimensional pattern;
   using the digital data set to create a mold surface with a three-dimensional pattern that is the mirror image of the desired three dimensional patterned concrete block face, the three-dimensional pattern on the mold surface having a maximum relief of at least about 0.5 inches;
   providing a mold having a plurality of side walls defining a mold cavity, the mold including the mold surface with the mirror image of the desired three-dimensional pattern concrete block face;
   introducing dry cast concrete into the mold cavity;
   compacting the dry cast concrete to form a pre-cured concrete block, wherein during compaction, the desired three-dimensional patterned face is imparted to the pre-cured concrete block by the mold surface with the mirror image of the desired three dimensional patterned concrete block face;
   discharging the pre-cured concrete block from the mold cavity; and
   curing the pre-cured concrete block.

2. The method of claim 1 wherein the step of using the digital data set to create the mold surface comprises machining the mold surface.

3. The method of claim 1 wherein the step of compacting the dry cast concrete includes pressing the patterned face of the mold surface having the three dimensional pattern into the dry cast concrete contained in the mold cavity.

4. The method of claim 1, including the step of displaying a digital image of the selected three-dimensional pattern created from the scanned data prior to the step of using the digital data set to create the mold surface.

5. The method of claim 4, including manipulating the displayed image to modify the three-dimensional pattern, and creating the digital data set from the manipulated image.

6. The method of claim 1, wherein the maximum relief is at least about 1.0 inch.

7. The method of claim 1, comprising selecting the three-dimensional pattern of at least one stone.

8. The method of claim 7, comprising selecting the three-dimensional patterns of a plurality of stones.

9. The method of claim 7, wherein the mold surface is a face of a stripper shoe.

10. The method of claim 9, comprising forming a flange along at least a portion of the perimeter of the stripper shoe face.

11. A method of making a concrete block having a three dimensional patterned front face, comprising the steps of:

selecting a three-dimensional pattern of one or more existing objects;

digitally scanning the selected three-dimensional pattern to create scanned data in XYZ coordinates that is representative of the selected three-dimensional pattern;

creating from the scanned data in the XYZ coordinates a digital data set that is representative of a desired three dimensional patterned front face of the concrete block based on the scanned data of the three-dimensional pattern;

using the digital data set to create a face of a mold shoe with a three-dimensional pattern that is the mirror image of the desired three dimensional patterned concrete block face, the three-dimensional pattern on the mold surface having a maximum relief of at least about 0.5 inches;

providing a mold having a plurality of side walls defining a mold cavity;

positioning a pallet underneath the mold cavity;

introducing dry cast concrete into the mold cavity;

compacting the dry cast concrete to form a pre-cured concrete block with the rear face of the block resting on the pallet and the front face of the block facing upward, the compacting step including introducing the mold shoe into the mold cavity and pressing the face of the mold shoe having the mirror image of the desired three-dimensional patterned concrete unit face into the dry cast concrete contained in the mold cavity to impart the desired three dimensional patterned concrete block face to the front face of the pre-cured concrete block;

discharging the pre-cured concrete block from the mold cavity; and curing the pre-cured concrete block.

12. The method of claim 11 wherein the step of using the digital data set to create the mold shoe face comprises machining the mold shoe face.

13. The method of claim 11, including the step of displaying a digital image of the selected three-dimensional pattern created from the scanned data prior to the step of using the digital data set to create the mold shoe face.

14. The method of claim 13, including manipulating the displayed image to modify the three-dimensional pattern, and creating the digital data set from the manipulated image.

15. The method of claim 11, wherein the maximum relief is at least about 1.0 inch.

16. The method of claim 11, comprising selecting the three-dimensional pattern of at least one stone.

17. The method of claim 16, comprising selecting the three-dimensional patterns of a plurality of stones.

18. The method of claim 11, comprising forming a flange along at least a portion of the perimeter of the mold shoe face.

19. The method of claim 1, wherein the mold surface is metal.

20. The method of claim 11, wherein the mold shoe is metal.

* * * * *

UNITED STATES PATENT AND TRADEMARK OFFICE
CERTIFICATE OF CORRECTION

PATENT NO. : 7,208,112 B2 Page 1 of 1
APPLICATION NO. : 10/359525
DATED : April 24, 2007
INVENTOR(S) : Scherer It is certified that error appears in the above-identified patent and that said Letters Patent is hereby corrected as shown below:

Col. 14, line 29, claim 1: "on the scarmed data" should read --on the scanned data--

Signed and Sealed this

Ninth Day of October, 2007

JON W. DUDAS
*Director of the United States Patent and Trademark Office*